US012223922B2

(12) United States Patent
Tanaka

(10) Patent No.: US 12,223,922 B2
(45) Date of Patent: Feb. 11, 2025

(54) DISPLAY DEVICE

(71) Applicant: Japan Display Inc., Tokyo (JP)

(72) Inventor: Hitoshi Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/217,841

(22) Filed: Jul. 3, 2023

(65) Prior Publication Data

US 2024/0013744 A1 Jan. 11, 2024

(30) Foreign Application Priority Data

Jul. 5, 2022 (JP) ................................ 2022-108548

(51) Int. Cl.
*G09G 3/36* (2006.01)
*G09G 3/00* (2006.01)

(52) U.S. Cl.
CPC ........... *G09G 3/3648* (2013.01); *G09G 3/001* (2013.01); *G09G 2300/0426* (2013.01); *G09G 2310/0232* (2013.01)

(58) Field of Classification Search
CPC ................. G09G 3/3648; G09G 3/001; G09G 2300/0426; G09G 2310/0232; G09G 2320/0233
See application file for complete search history.

(56) References Cited

U.S. PATENT DOCUMENTS 5,535,028 A * 7/1996 Bae ....................... G02F 1/1362 349/42
9,280,947 B2 * 3/2016 Kim ....................... G09G 5/003
9,780,125 B2 10/2017 Koide
10,008,174 B2 * 6/2018 Wu ....................... H01L 27/124
10,629,750 B2 * 4/2020 Sakai ................ H01L 21/02164
10,651,207 B2 5/2020 Hosowaka et al.
11,171,162 B2 11/2021 Hosowaka et al.
11,385,509 B2 * 7/2022 Wu ....................... G02F 1/1339
2009/0284705 A1 * 11/2009 Ogura ............... G02F 1/136286 349/144
2010/0156769 A1 * 6/2010 Chang .................. G09G 3/3648 345/87
2017/0025548 A1 * 1/2017 Yamazaki ............... H01L 29/45
2017/0062619 A1 * 3/2017 Sasagawa ........... H01L 27/1207
(Continued)

FOREIGN PATENT DOCUMENTS

CN 108415196 A * 8/2018
JP H06160900 A * 6/1994
(Continued)

*Primary Examiner* — Ricardo Osorio
(74) *Attorney, Agent, or Firm* — K&L Gates LLP

(57) ABSTRACT

A display device includes a substrate, a plurality of pixels provided in a display region of the substrate, a plurality of signal lines arrayed alongside each other in a first direction and extending in a second direction intersecting the first direction, a plurality of scanning lines extending in a direction intersecting the signal lines, and a scanning line drive circuit disposed in a peripheral region between an end part of the substrate and the display region and including a plurality of switching elements coupled to the scanning lines. The scanning lines include at least two or more scanning lines having different lengths, and the switching elements have longer channel widths as the scanning lines electrically coupled to the switching elements have longer lengths.

8 Claims, 18 Drawing Sheets

(56) References Cited

U.S. PATENT DOCUMENTS

| | | | | |
|---|---|---|---|---|
| 2017/0294171 | A1* | 10/2017 | Shima | G02F 1/136286 |
| 2019/0259345 | A1 | 8/2019 | Hosoyachi et al. | |
| 2022/0020337 | A1* | 1/2022 | Huang | G09G 3/3607 |
| 2023/0014991 | A1 | 1/2023 | Watanabe | |

FOREIGN PATENT DOCUMENTS

| | | | | |
|---|---|---|---|---|
| JP | 2008-261938 | A | | 10/2008 |
| JP | 2009008942 | A | | 1/2009 |
| JP | 2017-102301 | A | | 6/2017 |
| JP | 2019-061202 | A | | 4/2019 |
| JP | 2019-144326 | A | | 8/2019 |
| JP | 2021-193450 | A | | 12/2021 |
| KR | 19980068141 | A | * | 10/1998 |
| KR | 20090005651 | A | * | 1/2009 |
| WO | 2021200650 | A1 | | 10/2021 |

* cited by examiner

DISPLAY DEVICE

CROSS-REFERENCE TO RELATED APPLICATION

This application claims the benefit of priority from Japanese Patent Application No. 2022-108548 filed on Jul. 5, 2022, the entire contents of which are incorporated herein by reference.

BACKGROUND

1. Technical Field

The present disclosure relates to a display device.

2. Description of the Related Art

Japanese Patent Application Laid-open Publication No. 2019-144326 (JP-A-2019-144326), Japanese Patent Application Laid-open Publication No. 2008-261938 (JP-A-2008-261938), Japanese Patent Application Laid-open Publication No. 2021-193450 (JP-A-2021-193450), and Japanese Patent Application Laid-open Publication No. 2019-061202 (JP-A-2019-061202) each disclose a display device including a display region of a deformed outer shape other than a rectangular shape. The display devices of JP-A-2019-144326, JP-A-2008-261938, JP-A-2021-193450, and JP-A-2019-061202 are also called free-form displays. WO 2021/200650 A discloses a display device applied to a virtual reality (VR) system and having a configuration including a display region of a polygonal shape.

In a liquid crystal display device according to a technology disclosed in Japanese Patent Application Laid-open Publication No. 2009-008942 (JP-A-2009-008942), the voltage value of gate wire voltage is increased or decreased in a stepped manner in accordance with the timing of scanning of each driver IC to prevent gate voltage decrease due to wire resistance of in-panel wires.

A display device of Japanese Patent Application Laid-open Publication No. 2017-102301 (JP-A-2017-102301) includes a switch configured to supply a display or touch detection signal to each of a plurality of drive electrodes in a switching manner. JP-A-2017-102301 discloses a technology of differentiating the width of a common wire coupled to the switch and the channel width of a transistor, thereby shortening the time constant of a drive electrode separated from a control circuit. However, JP-A-2009-008942 and JP-A-2017-102301 disclose no free-form display.

In a free-form display, scanning lines at a part (for example, a corner part) having a deformed outer shape are formed to be shorter than in the other region.

Accordingly, variance of a total load on a configuration including a wire resistor on a scanning line and a scanning line drive circuit configured to drive the scanning line occurs among a plurality of scanning lines. The load variance among a plurality of scanning lines potentially degrades display performance.

SUMMARY

A display device according to an embodiment of the present disclosure includes a substrate, a plurality of pixels provided in a display region of the substrate, a plurality of signal lines arrayed alongside each other in a first direction and extending in a second direction intersecting the first direction, a plurality of scanning lines extending in a direction intersecting the signal lines, and a scanning line drive circuit disposed in a peripheral region between an end part of the substrate and the display region and including a plurality of switching elements coupled to the scanning lines. The scanning lines include at least two or more scanning lines having different lengths, and the switching elements have longer channel widths as the scanning lines electrically coupled to the switching elements have longer lengths.

DETAILED DESCRIPTION

Aspects (embodiments) of the present disclosure will be described below in detail with reference to the accompanying drawings. Contents described below in the embodiments do not limit the present disclosure.

Constituent components described below include those that could be easily thought of by the skilled person in the art and those identical in effect. Constituent components described below may be combined as appropriate. What is disclosed herein is merely exemplary, and any modification that could be easily thought of by the skilled person in the art as appropriate without departing from the gist of the present disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present disclosure and the drawings, any component same as that already described with reference to an already described drawing is denoted by the same reference sign, and detailed description thereof is omitted as appropriate in some cases.

In the present specification and the claims, an expression with "on" in description of an aspect in which one structural body is disposed on another structural body includes both a case in which the one structural body is directly disposed on the other structural body in contact and a case in which the one structural body is disposed above the other structural body with still another structural body interposed therebetween, unless otherwise stated in particular.

First Embodiment

Figure 1:
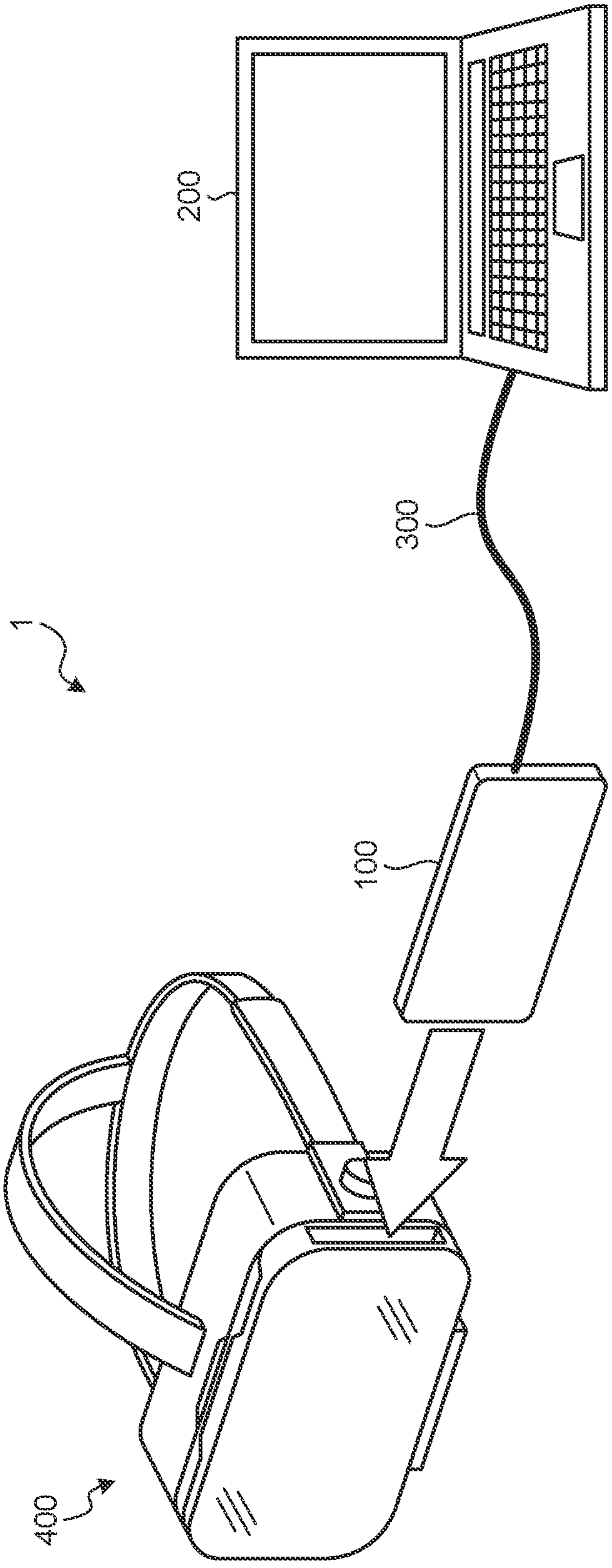
FIG. 1 is a configuration diagram illustrating an exemplary display system according to a first embodiment.

FIG. 1 is a configuration diagram illustrating an exemplary display system according to a first embodiment. In the present embodiment, a display system 1 is a display system configured to change display in accordance with motion of a user. For example, the display system 1 is a VR system configured to provide virtual reality to the user by stereoscopically displaying a VR image illustrating a three-dimensional object or the like in a virtual space and changing the stereoscopic display in accordance with the orientation (position) of the head of the user.

As illustrated in FIG. 1, the display system 1 includes, for example, a display device 100 and a control device 200. The display device 100 and the control device 200 have a configuration in which information (signal) can be input and output through a cable 300. Examples of the cable 300 include a universal serial bus (USB) cable and a high-definition multimedia interface (HDMI) (registered trademark) cable. The display device 100 and the control device 200 may have a configuration in which information can be input and output through wireless communication.

The display device 100 includes a display panel. The display panel is, for example, a liquid crystal display but may be an organic electro-luminescence (organic EL) panel, a μ-OLED, a μ-LED panel, a mini-LED panel, or the like.

The display device 100 is fixed to a mounting member 400. Examples of the mounting member 400 include a head set, goggles, and a helmet and a mask that cover the eyes of the user. The mounting member 400 is mounted on the head of the user. When mounted, the mounting member 400 is disposed in front of the user to cover the eyes of the user. The mounting member 400 functions as an immersive mounting member by positioning the display device 100 fixed therein in front of the eyes of the user. The mounting member 400 may include an output unit configured to output, for example, a sound signal output from the control device 200. Alternatively, the mounting member 400 may have a structure with built-in functions of the control device 200.

In the example illustrated in FIG. 1, the display device 100 is slotted into the mounting member 400 but may be fixed to the mounting member 400. In other words, the display system 1 may be constituted by a mounting display device and the control device 200, the mounting display device including the mounting member 400 and the display device 100.

Figure 2:
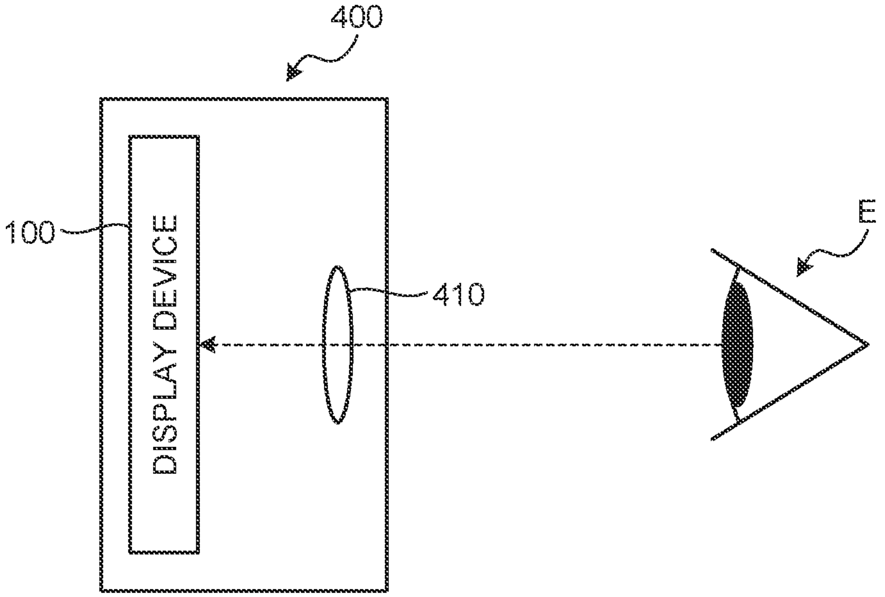
FIG. 2 is a schematic diagram illustrating an exemplary relative relation between a display device and a user eye.

FIG. 2 is a schematic diagram illustrating an exemplary relative relation between the display device and an eye of the user. As illustrated in FIG. 2, the mounting member 400 includes, for example, a lens 410 corresponding to each eye of the user. The lens 410 is a magnifying lens for imaging an image on the eye of the user. When mounted on the head of the user, the mounting member 400 positions the lens 410 in front of an eye E of the user. The user visually recognizes a display region of the display device 100, which is magnified through the lens 410. Thus, the resolution of the display device 100 needs to be increased to clearly display an image (screen). Although one lens 410 is exemplarily described in the present disclosure, for example, a plurality of lenses 410 may be provided and the display device 100 may be disposed at a position different from in front of eyes.

The control device 200 causes the display device 100 to display, for example, an image. The control device 200 may be an electronic apparatus such as a personal computer or a gaming apparatus. Examples of a virtual image include a computer graphic video and a 360 degree live video. The control device 200 outputs, to the display device 100, a three-dimensional image exploiting the parallax between the eyes of the user. The control device 200 outputs, to the display device 100, right-eye and left-eye images that follow the orientation of the head of the user.

Figure 3:
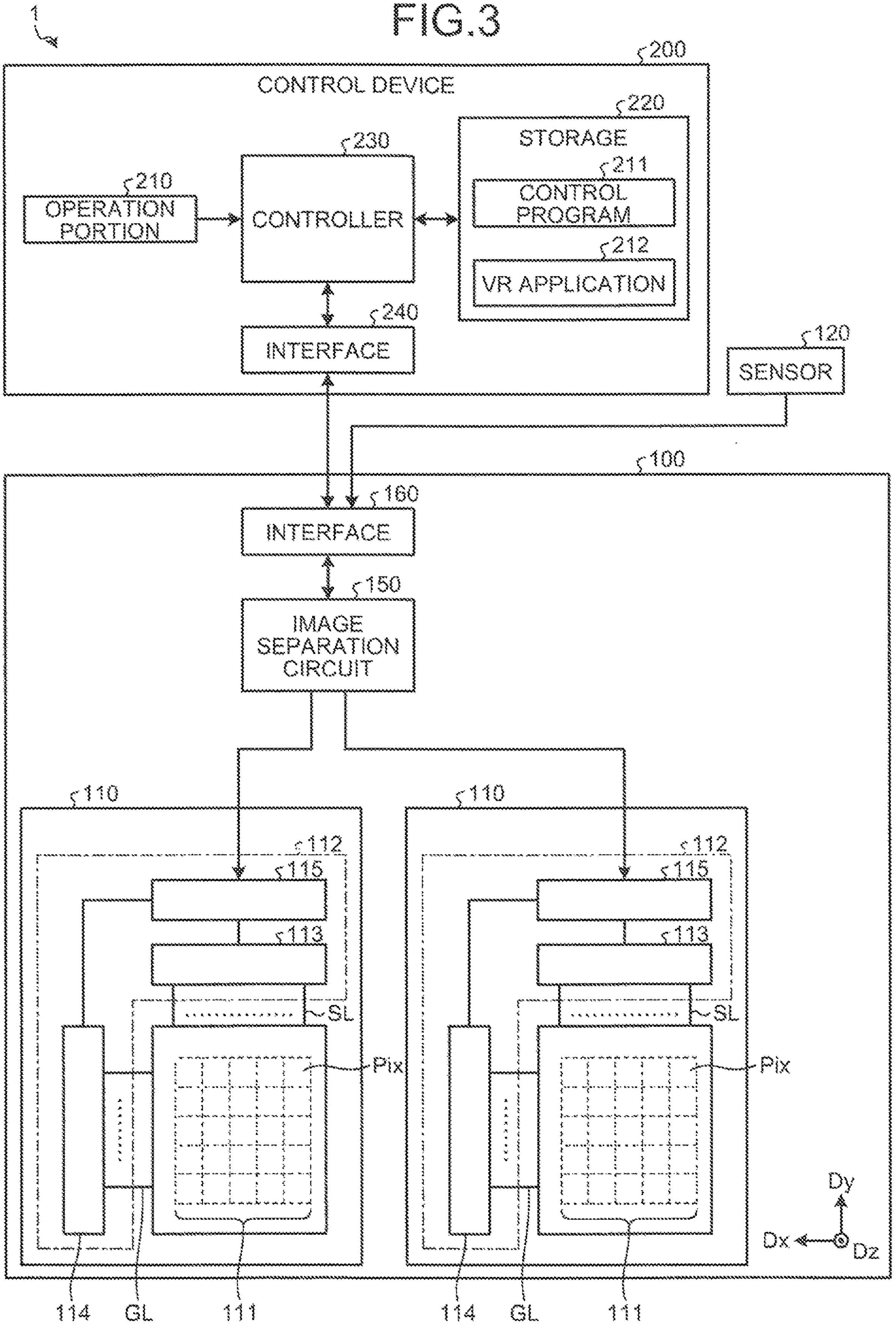
FIG. 3 is a block diagram illustrating an exemplary configuration of the display system according to the first embodiment.

FIG. 3 is a block diagram illustrating an exemplary configuration of the display system according to the first embodiment. As illustrated in FIG. 3, the display device 100 includes two display panels 110, a sensor 120, an image separation circuit 150, and an interface 160.

One of the two display panels 110 included in the display device 100 is used as a left-eye display panel 110, and the other display panel 110 is used as a right-eye display panel 110.

Each of the two display panels 110 includes a display region 111 and a display control circuit 112. Each display panel 110 includes a non-illustrated light source device (backlight IL to be described later) configured to irradiate the display region 111 from back.

The display region 111 includes a two-dimensional matrix (with a row-column configuration) of $P_0 \times Q_0$ pixels Pix ($P_0$ pixels in the row direction and $Q_0$ pixels in the column direction). In the present embodiment, $P_0$ is 2880 and $Q_0$ is 1700. The row direction corresponds to a first direction Dx, and the column direction corresponds to a second direction Dy. FIG. 3 schematically illustrates an arrangement of the pixels Pix, and detailed arrangement of the pixels Pix will be described later.

The display panels 110 includes scanning lines GL extending in the first direction Dx and signal lines SL extending in the second direction Dy intersecting the first direction Dx. For example, the display panels 110 includes 2880 signal lines SL and 1700 scanning lines GL. In the display panels 110, the pixels Pix are disposed in regions surrounded by the signal lines SL and the scanning lines GL. Each pixel Pix includes a switching element (thin film transistor (TFT)) coupled to the signal line SL and the scanning line GL, and a pixel electrode coupled to the switching element. Each scanning line GL is coupled to the pixels Pix disposed in the direction in which the scanning line GL extends. Each signal line SL is coupled to the pixels Pix disposed in the direction in which the signal line SL extends.

In the following description, the first direction Dx is an in-plane direction parallel to the surface of a first substrate 10 (refer to FIG. 6). The second direction Dy is an in-plane direction parallel to the surface of the first substrate 10 and orthogonal to the first direction Dx. The second direction Dy may intersect the first direction Dx instead of being orthogonal. A third direction Dz is orthogonal to the first direction Dx and the second direction Dy. The third direction Dz is the normal direction of the surface of the first substrate 10. A "plan view" illustrates a positional relation when viewed in a direction orthogonal to the surface of the first substrate 10.

The display region 111 of one of the two display panels 110 is for the right eye, and the display region 111 of the other display panel 110 is for the left eye. In description of the first embodiment, the display panels 110 include the two display panels 110 for the left and right eyes. However, the display device 100 is not limited to a structure including the two display panels 110 as described above. For example, one display panel 110 may be provided and the display region 111 of the display panel 110 may be divided into two so that a right-eye image is displayed in the right half region and a left-eye image is displayed in the left half region.

The display control circuit 112 includes a driver integrated circuit (IC) 115, a signal line coupling circuit 113, and a scanning line drive circuit 114. The signal line coupling circuit 113 is electrically coupled to the signal lines SL. The driver IC 115 controls, through the scanning line drive circuit 114, on and off of a switching element (for example, TFT) for controlling operation (light transmittance) of the pixels Pix. The scanning line drive circuit 114 is electrically coupled to the scanning lines GL.

The sensor 120 detects information based on which the orientation of the head of the user can be estimated. For example, the sensor 120 detects information indicating motion of the display device 100 and the mounting member 400, and the display system 1 estimates the orientation of the head of the user on which the display device 100 is mounted based on the information indicating motion of the display device 100 and the mounting member 400.

The sensor 120 detects information based on which the orientation of the line of sight can be estimated by using, for example, at least one of the angles, accelerations, angular velocities, orientations, and distances of the display device 100 and the mounting member 400. The sensor 120 may use, for example, a gyro sensor, an acceleration sensor, or an orientation sensor. For example, the sensor 120 may detect the angles and angular velocities of the display device 100 and the mounting member 400 by using the gyro sensor. For example, the sensor 120 may detect the direction and magnitude of acceleration applied to the display device 100 and the mounting member 400 by using the acceleration sensor.

For example, the sensor 120 may detect the orientation of the display device 100 by using the orientation sensor. For example, the sensor 120 may detect movement of the display device 100 and the mounting member 400 by using a distance sensor, a global positioning system (GPS) receiver, or the like. The sensor 120 may be any other sensor such as an optical sensor for detecting the orientation of the head of the user, change of the line of sight, movement, or the like and may be a combination of a plurality of sensors. The sensor 120 is electrically coupled to the image separation circuit 150 through the interface 160 to be described later.

The image separation circuit 150 receives left-eye image data and right-eye image data fed from the control device 200 through the cable 300, feeds the left-eye image data to the display panel 110 configured to display a left-eye image, and feeds the right-eye image data to the display panel 110 configured to display a right-eye image. The interface 160 includes a connector to which the cable 300 (FIG. 1) is coupled. A signal from the control device 200 is input to the interface 160 through the coupled cable 300. The image separation circuit 150 outputs a signal input from the sensor 120 to the control device 200 through the interface 160 and an interface 240. The signal input from the sensor 120 includes the above-described information based on which the orientation of the line of sight can be estimated. Alternatively, the signal input from the sensor 120 may be directly output to a controller 230 of the control device 200 through the interface 160. The interface 160 may be, for example, a wireless communication device and may transmit and receive information to and from the control device 200 through wireless communication.

The control device 200 includes an operation portion 210, a storage 220, the controller 230, and the interface 240.

The operation portion 210 receives an operation from the user. The operation portion 210 may be, for example, an input device such as a keyboard, a button, or a touch screen. The operation portion 210 is electrically coupled to the controller 230. The operation portion 210 outputs information in accordance with the operation to the controller 230.

The storage 220 stores computer programs and data. The storage 220 temporarily stores results of processing by the controller 230. The storage 220 includes a storage medium. Examples of the storage medium include a ROM, a RAM, a memory card, an optical disk, and a magneto optical disc. The storage 220 may store data of images to be displayed on the display device 100.

The storage 220 stores, for example, a control program 211 and a VR application 212. The control program 211 can provide, for example, functions related to various kinds of control for operating the control device 200. The VR application 212 can provide a function to cause the display device 100 to display a virtual reality image. The storage 220 can store various kinds of information input from the display device 100, such as data indicating results of detection by the sensor 120.

The controller 230 includes, for example, a micro control unit (MCU) or a central processing unit (CPU). The controller 230 can collectively control operation of the control device 200. Various kinds of functions of the controller 230 are achieved based on control by the controller 230.

The controller 230 includes, for example, a graphics processing unit (GPU) configured to generate images to be displayed. The GPU generates an image to be displayed on the display device 100. The controller 230 outputs the image generated by the GPU to the display device 100 through the interface 240. The controller 230 of the control device 200 includes the GPU in description of the present embodiment but is not limited thereto. For example, the GPU may be provided in the display device 100 or the image separation circuit 150 of the display device 100. In this case, the display device 100 may acquire data from the control device 200, an external electronic apparatus, or the like, and the GPU may generate an image based on the data.

The interface 240 includes a connector to which the cable 300 (refer to FIG. 1) is coupled. A signal from the display device 100 is input to the interface 240 through the cable 300. The interface 240 outputs the signal input from the controller 230 to the display device 100 through the cable 300. The interface 240 may be, for example, a wireless communication device and may transmit and receive information to and from the display device 100 through wireless communication.

When the VR application 212 is executed, the controller 230 causes the display device 100 to display an image in accordance with motion of the user (display device 100). When having detected change of the user (display device 100) while causing the display device 100 to display the image, the controller 230 changes the image displayed on the display device 100 to an image in the direction of the change. At start of image production, the controller 230 produces an image based on a reference viewpoint and a reference line of sight in a virtual space, and when having detected change of the user (display device 100), changes a viewpoint or line of sight for producing a displayed image from the direction of the reference viewpoint or the reference line of sight in accordance with motion of the user (display device 100), and causes the display device 100 to display an image based on the changed viewpoint or line of sight.

For example, the controller 230 detects rightward movement of the head of the user based on a result of detection by the sensor 120. In this case, the controller 230 changes a currently displayed image to an image when the line of sight is changed in the right direction. Accordingly, the user can visually recognize an image in the right direction of the image displayed on the display device 100.

For example, when having detected movement of the display device 100 based on a result of detection by the sensor 120, the controller 230 changes an image in accordance with the detected movement. When having detected frontward movement of the display device 100, the controller 230 changes the currently displayed image to an image in a case of movement to the front side of the currently displayed image. When having detected backward movement of the display device 100, the controller 230 changes the currently displayed image to an image in a case of movement to the back side of the currently displayed image. The user can visually recognize an image in a direction in which the user moves from an image displayed on the display device 100.

Figure 4:
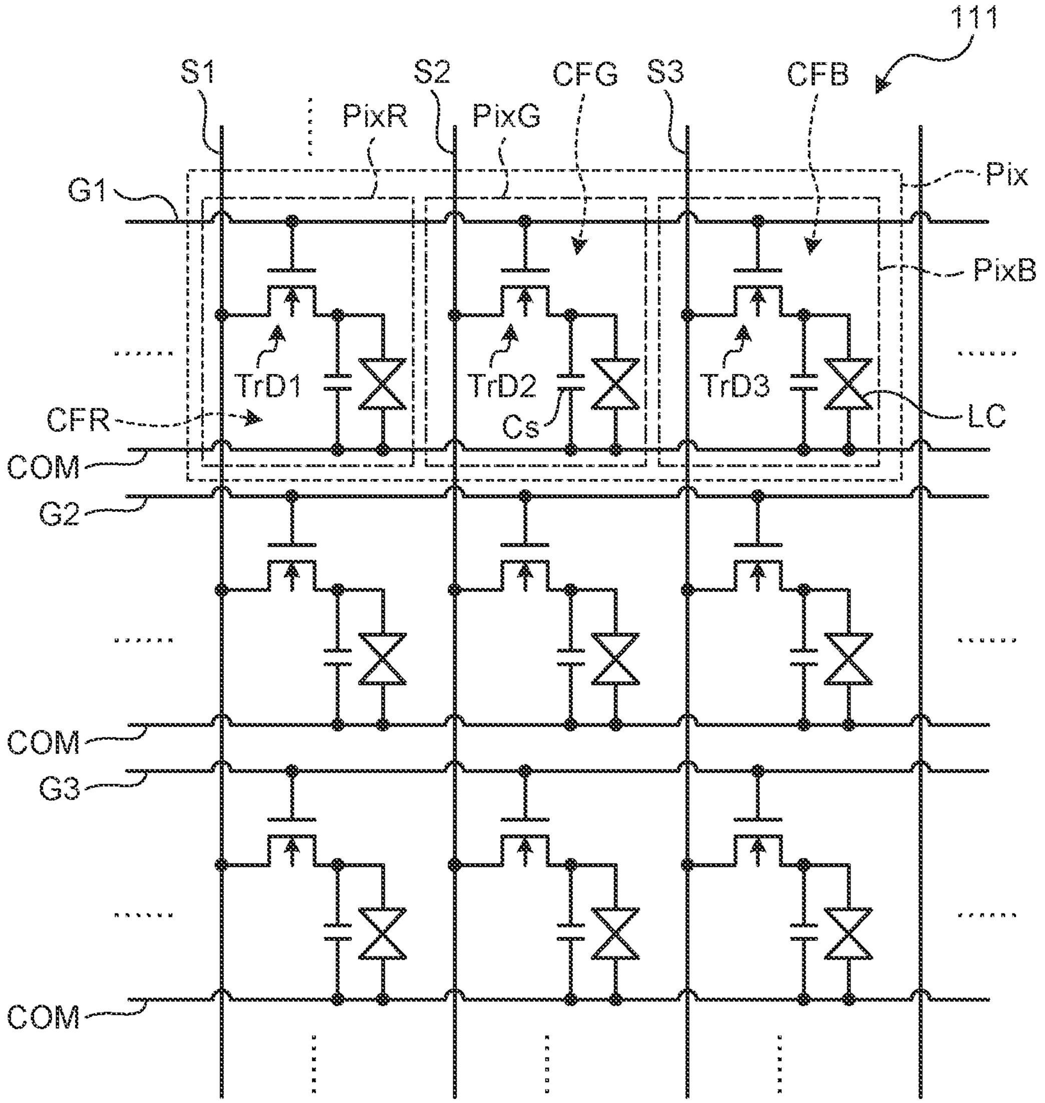
FIG. 4 is a circuit diagram illustrating a pixel arrangement of a display region according to the first embodiment.

FIG. 4 is a circuit diagram illustrating pixel arrangement of the display region according to the first embodiment. Hereinafter, the scanning lines GL described above collectively refer to a plurality of scanning lines G1, G2, and G3. The signal lines SL described above collectively refer to a plurality of signal lines S1, S2, and S3. In the example illustrated in FIG. 4, the scanning lines GL are orthogonal to the signal lines SL, but the present disclosure is not limited thereto. For example, the scanning lines GL do not necessarily need to be orthogonal to the signal lines SL.

As illustrated in FIG. 4, for example, switching elements TrD1, TrD2, and TrD3 of pixels PixR, PixG, and PixB, the signal lines SL, and the scanning lines GL are formed in the display region 111. The signal lines S1, S2, and S3 are wires for supplying pixel signals to pixel electrodes PE1, PE2, and PE3 (refer to FIG. 6). The scanning lines G1, G2, and G3 are wires for supplying gate signals that drive the switching elements TrD1, TrD2, and TrD3.

The pixels Pix in the display region 111 include the arrayed pixels PixR, PixG, and PixB. Hereinafter, the pixels PixR, PixG, and PixB are collectively referred to as pixels Pix in some cases. The pixels PixR, PixG, and PixB include the respective switching elements TrD1, TrD2, and TrD3 and capacitors of a liquid crystal layer LC. The switching elements TrD1, TrD2, and TrD3 are each constituted by a thin film transistor and, in this example, constituted by an n-channel metal oxide semiconductor (MOS) TFT. A sixth insulating film 16 (refer to FIG. 6) is provided between the pixel electrodes PE1, PE2, and PE3 and a common electrode COM to be described later, and holding capacitors Cs illustrated in FIG. 4 are formed by these components.

Color filters CFR, CFG, and CFB illustrated in FIG. 4 correspond to periodically arrayed color regions colored in, for example, three colors of red (R; first color), green (G; second color), and blue (B; third color). The above-described pixels PixR, PixG, and PixB illustrated in FIG. 4 are associated with a set of color regions in the three colors of R, G, and B. The pixels PixR, PixG, and PixB corresponding to the color regions in the three colors are grouped as a set. The color filters may include color regions in four or more colors. The pixels PixR, PixG, and PixB are each called a sub pixel in some cases.

Figure 5:
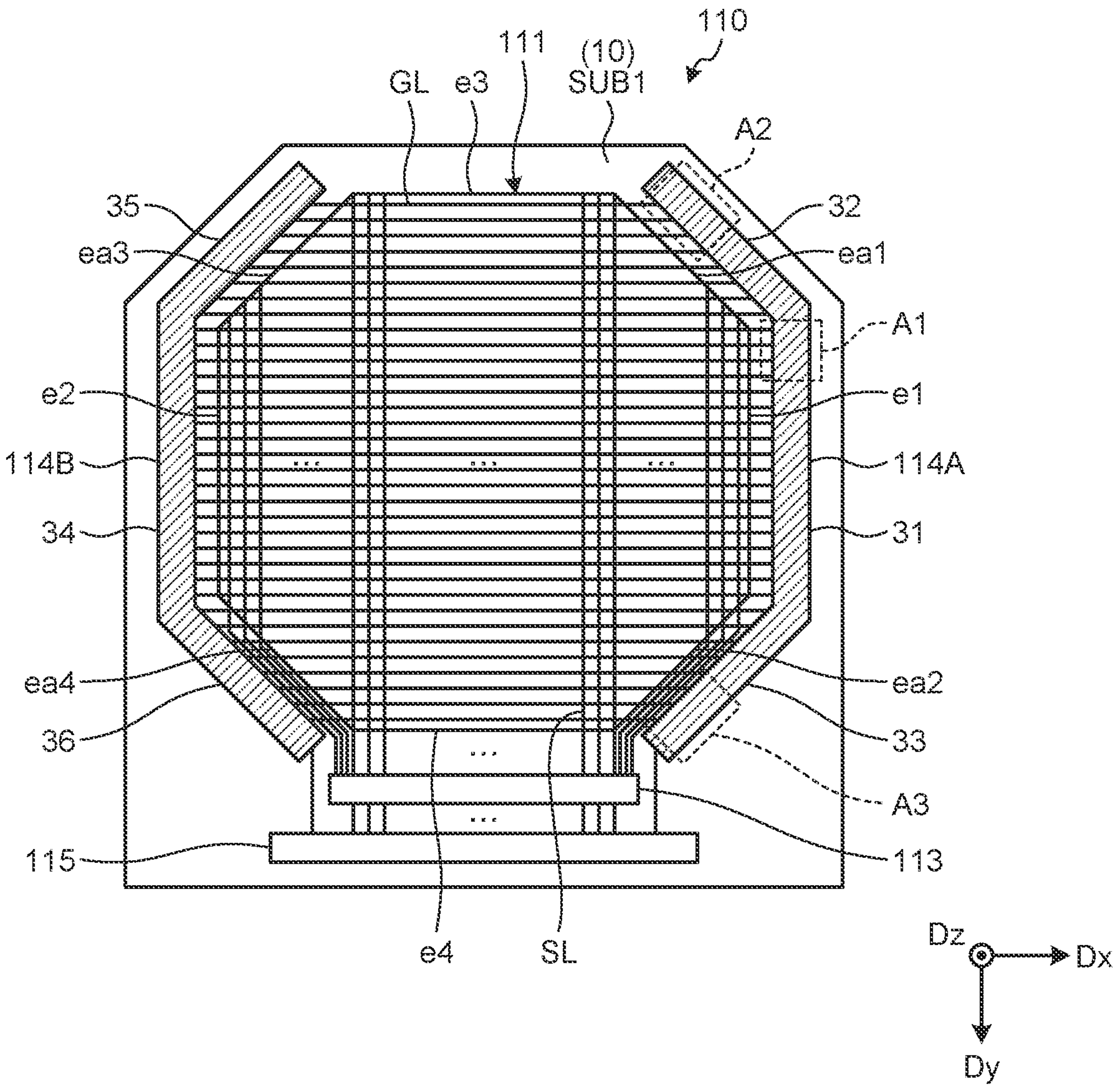
FIG. 5 is a schematic diagram illustrating an exemplary display panel according to the first embodiment.

FIG. 5 is a schematic diagram illustrating an exemplary display panel according to the first embodiment. In FIG. 5, some of the signal lines are omitted for clearer appearance of the drawing.

As illustrated in FIG. 5, the display region 111 of each display panel 110 has a polygonal shape in a plan view. More specifically, the display region 111 has an octagonal shape with a first side e1, a second side e2, a third side e3, a fourth side e4, a first tilted side ea1, a second tilted side ea2, a third tilted side ea3, and a fourth tilted side ea4. A region between a substrate end part of the first substrate 10 of the display panel 110 and each side of the display region 111 is called a peripheral region.

The first side e1 is positioned on the right side on the outer periphery of the display region 111 and extends in the second direction Dy. The second side e2 is positioned on a side opposite the first side e1, in other words, on the left side on the outer periphery of the display region 111 and extends in the second direction Dy. The third side e3 is positioned on the upper side on the outer periphery of the display region 111 and extends in the first direction Dx. The fourth side e4 is positioned on a side opposite the third side e3, in other words, on the lower side on the outer periphery of the display region 111 and extends in the first direction Dx.

A plurality of signal lines SL provided in regions corresponding to the third side e3 and the fourth side e4 have equal lengths in the second direction Dy. A plurality of scanning lines GL provided in regions corresponding to the first side e1 and the second side e2 have equal lengths in the first direction Dx.

The first tilted side ea1 is a side between the first side e1 and the third side e3 and is coupled to one end side (upper end side in FIG. 5) of the first side e1 and tilted in the second direction Dy. The second tilted side ea2 is a side between the first side e1 and the fourth side e4 and is coupled to the other end side (lower end side in FIG. 5) of the first side e1 and tilted in the second direction Dy. The third tilted side ea3 is a side between the second side e2 and the third side e3 and is coupled to one end side of the second side e2 and tilted in the second direction Dy. The fourth tilted side ea4 is a side between the second side e2 and the fourth side e4 and is coupled to the other end side of the second side e2 and tilted in the second direction Dy.

In the present embodiment, the first tilted side ea1 and the second tilted side ea2 are provided in a line symmetric manner with the axis of symmetry at a virtual line parallel to the first direction Dx through the middle point of the first side e1. The lengths of the signal lines SL provided in regions corresponding to the first tilted side ea1 and the second tilted side ea2 in the second direction Dy are shorter than the lengths of the signal lines SL provided in the regions corresponding to the third side e3 and the fourth side e4 in the second direction Dy. The lengths of the signal lines SL provided in the regions corresponding to the first tilted side ea1 and the second tilted side ea2 in the second direction Dy decrease as separation from the right ends of the third side e3 and the fourth side e4 in the first direction Dx increases (in other words, as separation from the first side e1 decreases).

The third tilted side ea3 and the fourth tilted side ea4 are provided in a line symmetric manner with the axis of symmetry at a virtual line parallel to the first direction Dx through the middle point of the second side e2. The lengths of the signal lines SL provided in regions corresponding to the third tilted side ea3 and the fourth tilted side ea4 in the second direction Dy are shorter than the lengths of the signal lines SL provided in the regions corresponding to the third side e3 and the fourth side e4 in the second direction Dy. The lengths of the signal lines SL provided in the regions corresponding to the third tilted side ea3 and the fourth tilted side ea4 in the second direction Dy decrease as separation from the left ends of the third side e3 and the fourth side e4 in the first direction Dx increases (in other words, as separation from the second side e2 decreases).

The first tilted side ea1 and the third tilted side ea3 are provided in a line symmetric manner with the axis of symmetry at a virtual line parallel to the second direction Dy through the middle point of the third side e3. The lengths of the scanning lines GL provided in regions corresponding to the first tilted side ea1 and the third tilted side ea3 in the first direction Dx are shorter than the lengths of the scanning lines GL provided in the regions corresponding to the first side e1 and the second side e2 in the first direction Dx. The lengths of the scanning lines GL provided in each of the regions corresponding to the first tilted side ea1 and the third tilted side ea3 in the first direction Dx decrease as separation from one end of the corresponding one of the first side e1 and the second side e2 in a direction along the first tilted side ea1 or the third tilted side ea3 increases (in other words, as separation from the third side e3 decreases).

The second tilted side ea2 and the fourth tilted side ea4 are provided in a line symmetric manner with the axis of symmetry at a virtual line parallel to the second direction Dy through the middle point of the fourth side e4. The lengths of the scanning lines GL provided in regions corresponding to the second tilted side ea2 and the fourth tilted side ea4 in the first direction Dx are shorter than the lengths of the scanning lines GL provided in the regions corresponding to the first side e1 and the second side e2 in the first direction Dx. The lengths of the scanning lines GL provided in each of the regions corresponding to the second tilted side ea2 and the fourth tilted side ea4 in the first direction Dx decrease as separation from the other end of the corresponding one of the first side e1 and the second side e2 in a direction along the second tilted side ea2 or the fourth tilted side ea4 increases (in other words, as separation from the fourth side e4 decreases).

A scanning line drive circuit 114A is disposed in the peripheral region between the substrate end part of the first substrate 10 of the display panel 110 and each of the first tilted side ea1, the first side e1, and the second tilted side ea2 of the display region 111. More specifically, the scanning line drive circuit 114A includes a first circuit portion 31 provided along the first side e1, a second circuit portion 32 provided along the first tilted side ea1, and a third circuit portion 33 provided along the second tilted side ea2.

A scanning line drive circuit 114B is positioned on a side opposite the scanning line drive circuit 114A and disposed in the peripheral region between the substrate end part of the first substrate 10 of the display panel 110 and each of the second tilted side ea2, the second side e2, and the fourth tilted side ea4 of the display region 111. More specifically, the scanning line drive circuit 114B includes a fourth circuit portion 34 provided along the second side e2, a fifth circuit portion 35 provided along the third tilted side ea3, and a sixth circuit portion 36 provided along the fourth tilted side ea4. The right end sides of the scanning lines GL are electrically coupled to the scanning line drive circuit 114A, and the left end sides of the scanning lines GL are electrically coupled to the scanning line drive circuit 114B.

The signal line coupling circuit 113 is disposed in the peripheral region between the substrate end part of the first substrate 10 of the display panel 110 and the fourth side e4 of the display region 111. The signal line coupling circuit 113 is electrically coupled the signal lines SL. The driver IC 115 is disposed in the peripheral region between the substrate end part of the first substrate 10 of the display panel 110 and the fourth side e4 of the display region 111. The driver IC 115 is a circuit configured to control the scanning line drive circuits 114A and 114B and the signal line coupling circuit 113.

In the example illustrated in FIG. 5, the signal lines SL are arrayed alongside each other in the first direction Dx and extend in parallel to the second direction Dy. The scanning lines GL extend in parallel to the direction (first direction Dx) intersecting the signal lines SL. Since the direction in which the scanning lines GL extend is orthogonal to the direction in which the signal lines SL extend, for example, the pixels PixR, PixG, and PixB (refer to FIG. 7) have rectangular shapes. However, the pixels PixR, PixG, and PixB are not limited to rectangular shapes.

The pixels PixR, PixG, and PixB may have, for example, parallelogram shapes. The pixels PixR, PixG, and PixB are referred to as pixels PixS in some cases.

Figure 6:
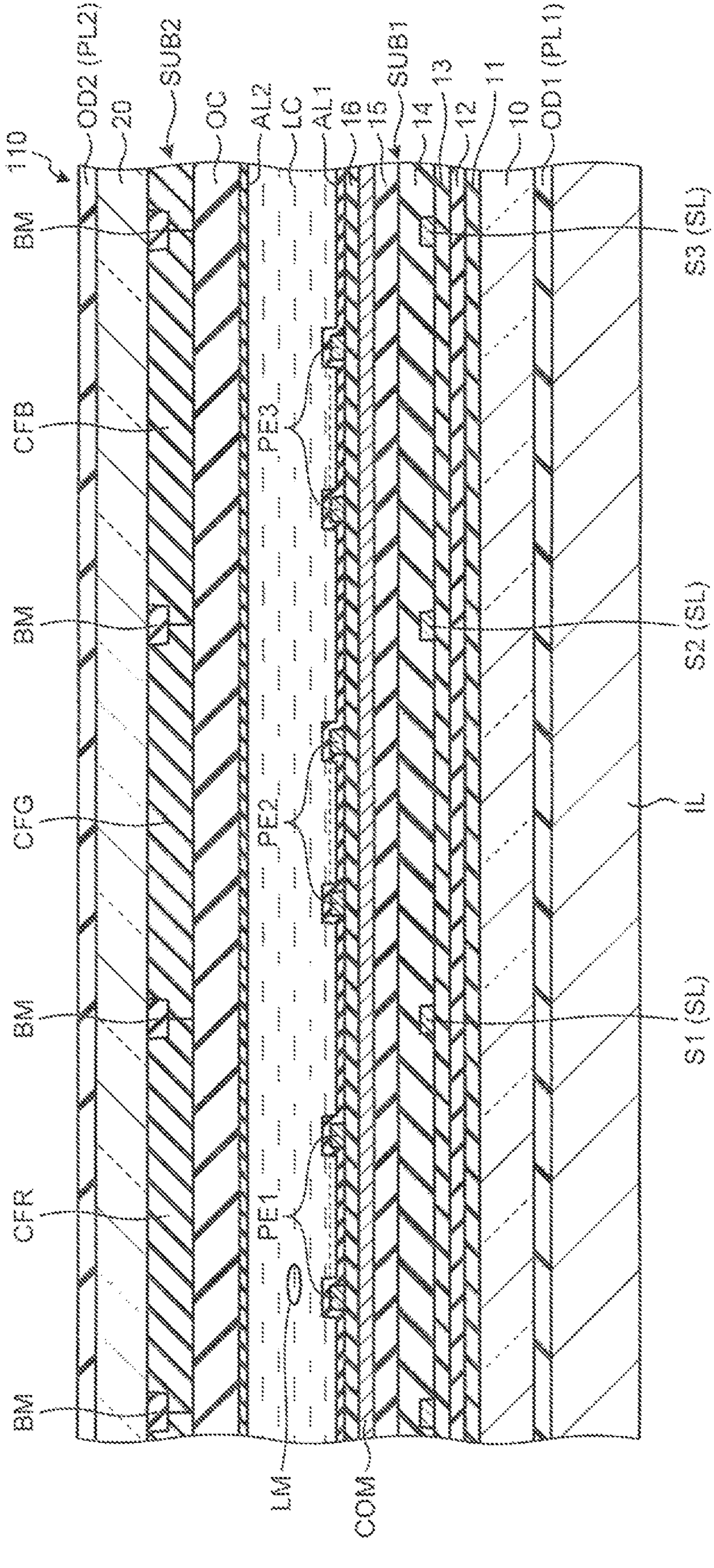
FIG. 6 is a sectional view schematically illustrating a section of the display panel according to the first embodiment.

The following describes a sectional structure of each display panel 110 with reference to FIG. 6. FIG. 6 is a sectional view schematically illustrating a section of each display panel according to the first embodiment. In FIG. 6, an array substrate SUB1 is based on the translucent first substrate 10 such as a glass substrate or a resin substrate. The array substrate SUB1 includes, on a side on which the first substrate 10 faces a counter substrate SUB2, a first insulating film 11, a second insulating film 12, a third insulating film 13, a fourth insulating film 14, a fifth insulating film 15, the sixth insulating film 16, the signal lines S1 to S3, the pixel electrodes PE1 to PE3, the common electrode COM, a first alignment film AL1, and the like. In the following description, the direction from the array substrate SUB1 toward the counter substrate SUB2 is referred to as upward or up.

The first insulating film 11 is positioned on the upper side of the first substrate 10. The second insulating film 12 is positioned on the upper side of the first insulating film 11. The third insulating film 13 is positioned on the upper side of the second insulating film 12. The signal lines S1 to S3 are positioned on the upper side of the third insulating film 13. The fourth insulating film 14 positioned on the upper side of the third insulating film 13 and covers the signal lines S1 to S3.

Wires may be disposed on the upper side of the fourth insulating film 14 as necessary. The wires are covered by the fifth insulating film 15. The wires are omitted in the present embodiment. The first insulating film 11, the second insulating film 12, the third insulating film 13, and the sixth insulating film 16 are formed of a translucent inorganic material such as silicon oxide or silicon nitride. The fourth insulating film 14 and the fifth insulating film 15 are formed of a translucent resin material and have thicknesses larger than those of the other insulating films formed of the inorganic material. However, the fifth insulating film 15 may be formed of an inorganic material.

The common electrode COM is positioned on the upper side of the fifth insulating film 15. The common electrode COM is covered by the sixth insulating film 16. The sixth insulating film 16 is formed of a translucent inorganic material such as silicon oxide or silicon nitride.

The pixel electrodes PE1 to PE3 are positioned on the upper side of the sixth insulating film 16 and face the common electrode COM through the sixth insulating film 16. The pixel electrodes PE1 to PE3 and the common electrode COM are formed of a translucent conductive material such as indium tin oxide (ITO) or indium zinc oxide (IZO). The pixel electrodes PE1 to PE3 are covered by the first alignment film AL1. The first alignment film AL1 covers the sixth insulating film 16 as well.

The counter substrate SUB2 is based on a translucent second substrate 20 such as a glass substrate or a resin substrate. The counter substrate SUB2 includes, on a side on which the second substrate 20 faces the array substrate SUB1, a light-shielding layer BM, the color filters CFR, CFG, and CFB, an overcoat layer OC, a second alignment film AL2, and the like.

As illustrated in FIG. 6, the light-shielding layer BM is positioned on the side on which the second substrate 20 faces the array substrate SUB1. The light-shielding layer BM defines the sizes of openings facing the respective pixel electrodes PE1 to PE3. The light-shielding layer BM is formed of a black resin material or a light-shielding metallic material.

The color filters CFR, CFG, and CFB are positioned on the side on which the second substrate 20 faces the array substrate SUB1, and end parts of each color filter overlap the light-shielding layer BM. The color filter CFR faces the pixel electrode PE1. The color filter CFG faces the pixel electrode PE2. The color filter CFB faces the pixel electrode PE3. For example, the color filters CFR, CFG, and CFB are formed of resin materials colored in blue, red, and green, respectively.

The overcoat layer OC covers the color filters CFR, CFG, and CFB. The overcoat layer OC is formed of a translucent resin material. The second alignment film AL2 covers the overcoat layer OC. The first alignment film AL1 and the second alignment film AL2 are formed of, for example, a material having horizontal orientation.

As described above, the counter substrate SUB2 includes the light-shielding layer BM and the color filters CFR, CFG, CFB, and the like. The light-shielding layer BM is disposed in regions facing wire parts such as the scanning lines G1, G2, and G3, the signal lines S1, S2, and S3, the switching elements TrD1, TrD2, and TrD3 illustrated in FIG. 4.

The counter substrate SUB2 includes the color filters CFR, CFG, and CFB in three colors in FIG. 6, but may include color filters in four or more colors including color filters in other colors such as white, transparent, yellow, magenta, and cyan, which are different from blue, red, and green. The color filters CFR, CFG, and CFB may be included in the array substrate SUB1.

The color filters CF are provided in the counter substrate SUB2 in FIG. 6, but what is called a color-filter-on-array (COA) structure including the color filters CF in the array substrate SUB1 may be employed.

The array substrate SUB1 and the counter substrate SUB2 described above are disposed so that the first alignment film AL1 and the second alignment film AL2 face each other. The liquid crystal layer LC is encapsulated between the first alignment film AL1 and the second alignment film AL2. The liquid crystal layer LC is made of a negative liquid crystal material having negative dielectric constant anisotropy or a positive liquid crystal material having positive dielectric constant anisotropy.

The array substrate SUB1 faces a backlight unit IL, and the counter substrate SUB2 is positioned on a display surface side. The backlight unit IL is applicable in various kinds of forms, but description of a detailed structure thereof is omitted.

A first optical element OD1 including a first polarization plate PL1 is disposed on the outer surface of the first substrate 10 or its surface facing the backlight unit IL. A second optical element OD2 including a second polarization plate PL2 is disposed on the outer surface of the second substrate 20 or its surface on an observation position side. A first polarization axis of the first polarization plate PL1 and a second polarization axis of the second polarization plate PL2 are in, for example, a cross Nicol positional relation on an X-Y plane. The first optical element OD1 and the second optical element OD2 may each include another optical functional element such as a wave plate.

For example, in a state in which no voltage is applied to the liquid crystal layer LC when the liquid crystal layer LC is a negative liquid crystal material, the long axis of each liquid crystal molecule LM is initially oriented in the X direction on an X-Y plane. In a state in which voltage is applied to the liquid crystal layer LC, in other words, in an "on" state in which an electric field is formed between each of the pixel electrodes PE1 to PE3 and the common electrode COM, the orientation state of the liquid crystal molecule LM changes due to influence of the electric field. In the "on" state, the polarization state of incident linearly polarized light changes in accordance with the orientation state of the liquid crystal molecule LM as the light passes through the liquid crystal layer LC.

Figure 7:
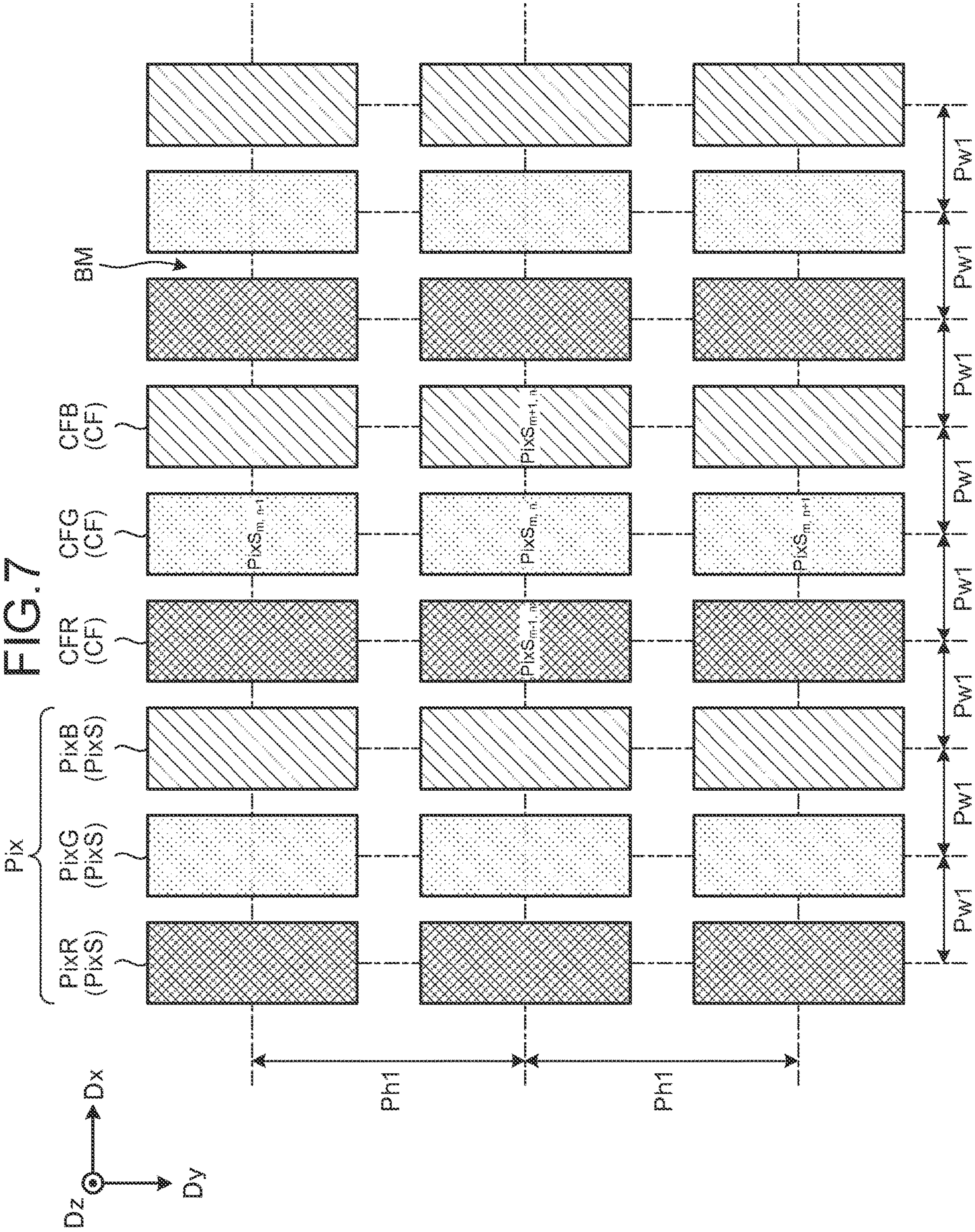
FIG. 7 is a diagram illustrating an exemplary pixel arrangement according to the first embodiment.
Figure 8:
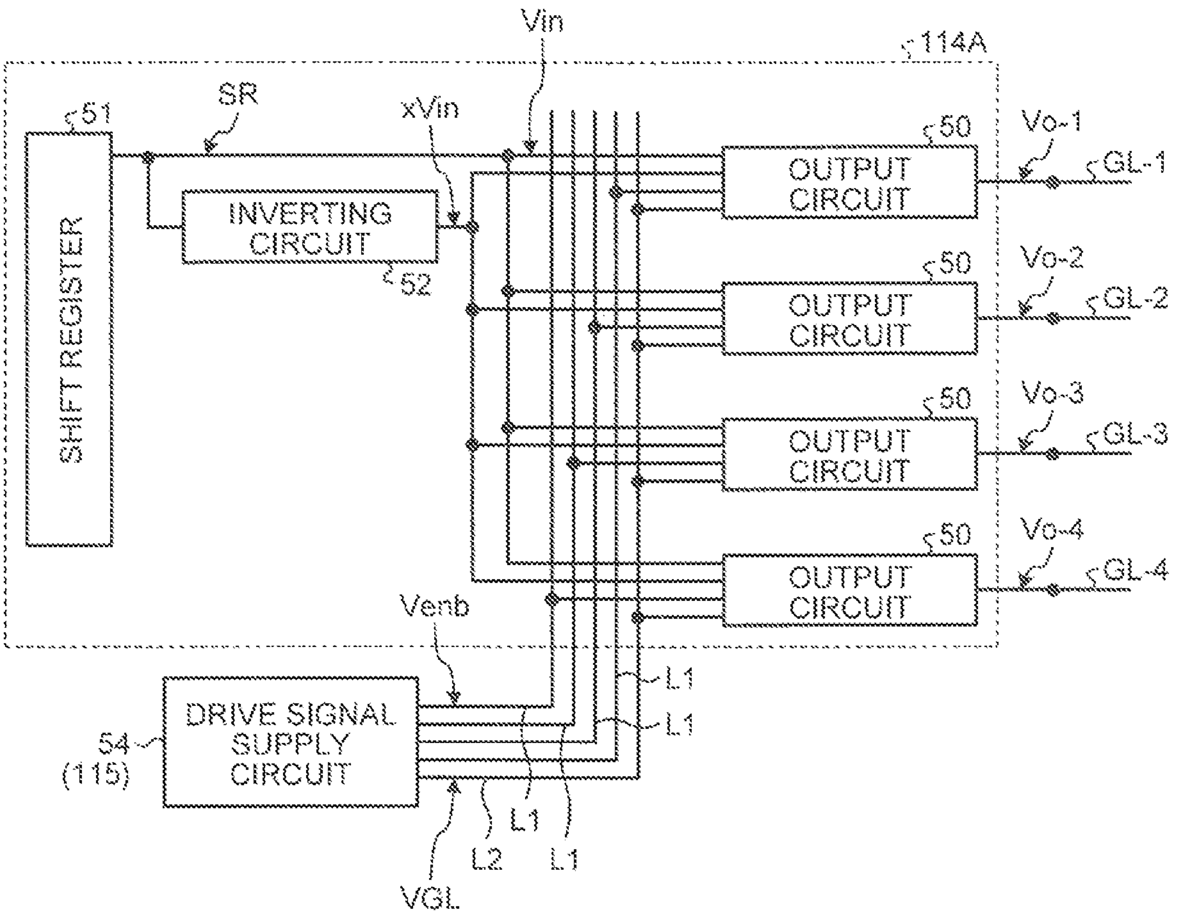
FIG. 8 is a block diagram illustrating an exemplary configuration of a scanning line drive circuit according to the first embodiment.

FIG. 7 is a diagram illustrating an exemplary pixel arrangement according to the first embodiment. In FIG. 7, Ph1 represents the distance (disposition pitch) between pixels PixS (pixels PixR, PixG, and PixB) in the second direction Dy, and Pw1 represents the distance (disposition pitch) therebetween in the first direction Dx. In FIG. 8, only any constituent component necessary for description in the present disclosure is illustrated and any other constituent component is omitted or simplified.

As illustrated in FIG. 7, the color filters CF (CFR, CFG, and CFB) of the pixels PixS (pixels PixR, PixG, and PixB) are partitioned by the light-shielding layer BM in each display panel 110 according to the present embodiment. The pixels PixS (pixels PixR, PixG, and PixB) emit light in colors (blue, red, and green) as light radiated from the backlight unit IL transmits through opening parts at which the color filters CF (CFR, CFG, and CFB) are provided.

The pixels PixR, PixG, and PixB are repeatedly arrayed in the stated order in the first direction Dx. The pixels PixR, PixG, and PixB in each color are arrayed alongside each other in the second direction Dy.

The following describes a detailed configuration of the scanning line drive circuit 114A with reference to FIGS. 8 to 12. Although the following description is made on the scanning line drive circuit 114A, the description of the scanning line drive circuit 114A is also applicable to the scanning line drive circuit 114B since the scanning line drive circuit 114B has the same configuration.

As illustrated in FIG. 8, the scanning line drive circuit 114A includes a plurality of output circuits 50, a shift register 51, and an inverting circuit 52. The shift register 51 is a circuit configured to sequentially output a scanning signal SR to the output circuits 50 based on, for example, a clock signal from the driver IC 115 (refer to FIG. 5). The scanning signal SR output from the shift register 51 is supplied as a common input signal Vin to four output circuits 50.

The inverting circuit 52 is a circuit configured to output an input signal xVin obtained by inverting the scanning signal SR from the shift register 51. When the scanning signal SR is high (high level voltage), the inverting circuit 52 outputs the input signal xVin that is low (low level voltage). When the scanning signal SR is low (low level voltage), the inverting circuit 52 outputs the input signal xVin that is high (high level voltage). The input signal xVin output from the inverting circuit 52 is supplied as a common signal to the four output circuits 50.

A drive signal supply circuit 54 is a circuit configured to supply a first control signal Venb and a second control signal VGL to the four output circuits 50. The first control signal Venb is supplied to the four output circuits 50 through respective four wires L1. The second control signal VGL is supplied to the four output circuits 50 through a common wire L2. The drive signal supply circuit 54 is, for example, a circuit included in the driver IC 115. However, the drive signal supply circuit 54 may be provided individually from the driver IC 115.

Each of the output circuits 50 is provided at the corresponding one of a plurality of scanning lines GL-1, GL-2, GL-3, and GL-4, respectively. The output circuits 50 are circuits configured to output output signals Vo to the scanning lines GL-1, GL-2, GL-3, and GL-4 based on the input signals Vin and xVin. In the following description, the scanning lines GL-1, GL-2, GL-3, and GL-4 are simply referred to as scanning lines GL when not needing to be distinguished from one another.

The output signals Vo are gate drive signals for the switching elements TrD1, TrD2, and TrD3 (refer to FIG. 4) included in the pixels Pix and each include any one of the first control signal Venb and the second control signal VGL from the drive signal supply circuit 54. The first control signal Venb is a signal having potential with which the switching elements TrD1, TrD2, and TrD3 are turned on, and the second control signal VGL is a signal having potential with which the switching elements TrD1, TrD2, and TrD3 are turned off.

Although the four output circuits 50 and the four scanning lines GL are illustrated in FIG. 8, the shift register 51 sequentially supplies the scanning signal SR to the four output circuits 50 (four scanning lines GL) in a time divisional manner. The number of the output circuits 50 to which the common scanning signal SR is supplied is not limited to four but may be one to three inclusive or five or more. The scanning line drive circuit 114A in FIG. 8 is merely schematically illustrated and may include another circuit such as a buffer circuit or a level shifter as necessary.

Figure 9:
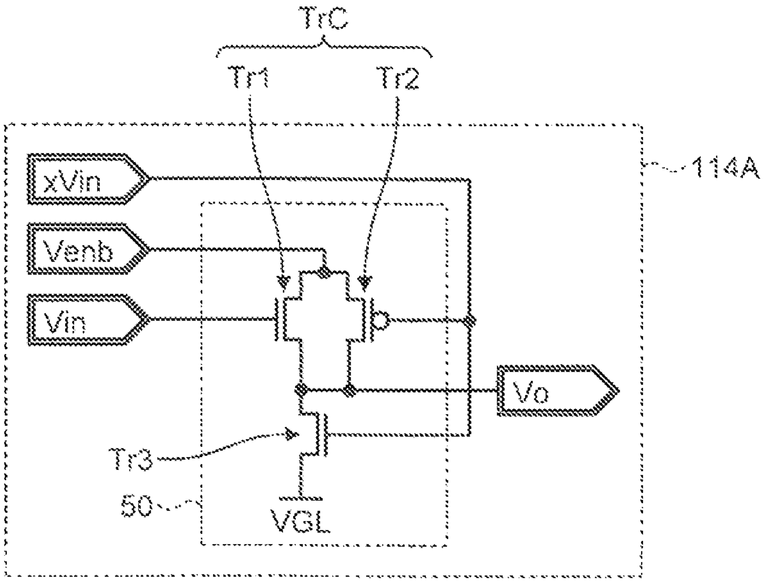
FIG. 9 is a circuit diagram illustrating an exemplary configuration of an output circuit of the scanning line drive circuit.

FIG. 9 is a circuit diagram illustrating an exemplary configuration of each output circuit of each scanning line drive circuit. As illustrated in FIG. 9, each output circuit 50 includes a first switching element Tr1, a second switching element Tr2, and a third switching element Tr3. The first switching element Tr1 is constituted by an n-channel MOS TFT. The second switching element Tr2 is constituted by a p-channel MOS TFT. The first switching element Tr1 and the second switching element Tr2 are coupled to each other in parallel and configured as a switching element TrC having a CMOS structure. The third switching element Tr3 is constituted by an n-channel MOS TFT.

The gate of the first switching element Tr1 is supplied with the input signal Vin based on the scanning signal SR from the shift register 51. The first switching element Tr1 is turned on and off under control of the input signal Vin. The gates of the second switching element Tr2 and the third switching element Tr3 are supplied with the input signal xVin obtained by inverting the scanning signal SR from the shift register 51. The second switching element Tr2 and the third switching element Tr3 are turned on and off under control of the input signal xVin.

The first control signal Venb is supplied from the drive signal supply circuit 54 to the input side of the first switching element Tr1 and the input side of the second switching element Tr2 through the corresponding wire L1 (refer to FIG. 8). The second control signal VGL is supplied from the drive signal supply circuit 54 to the input side of the second switching element Tr2 through the wire L2 (refer to FIG. 8). The output side of the first switching element Tr1, the output side of the second switching element Tr2, and the output side of the third switching element Tr3 are electrically coupled to the corresponding scanning line GL and output the output signal Vo.

When the input signal Vin is high (high level voltage) and the input signal xVin is low (low level voltage), the first switching element Tr1 and the second switching element Tr2 are turned on (conduction state) and the third switching element Tr3 is turned off (non-conduction state). Thus, the output circuit 50 outputs the first control signal Venb as the output signal Vo. Accordingly, the scanning line GL coupled to the output circuit 50 is selected.

When the input signal Vin is low (low level voltage) and the input signal xVin is high (high level voltage), the first switching element Tr1 and the second switching element Tr2 are turned off (non-conduction state) and the third switching element Tr3 is turned on (conduction state). Thus, the output circuit 50 outputs the second control signal VGL as the output signal Vo. Accordingly, the scanning line GL coupled to the output circuit 50 is not selected.

Since the four output circuits 50 are supplied with the common input signals Vin and xVin as illustrated in FIG. 8, the switching elements Tr of the four output circuits 50 are controlled and turned on and off in synchronization. Moreover, since the four output circuits 50 are individually coupled to the wires L1, the drive signal supply circuit 54 may output the first control signal Venb to the four output circuits 50 in a time divisional manner. In this case, the scanning lines GL coupled to the four output circuits 50, respectively, are sequentially selected in a time divisional manner.

Since the four output circuits 50 are coupled to the common wire L2 as illustrated in FIG. 8, the drive signal supply circuit 54 outputs the second control signal VGL as the common output signal Vo to the four output circuits 50. In this case, the scanning lines GL coupled to the four output circuits 50 are not selected in synchronization.

Figure 10:
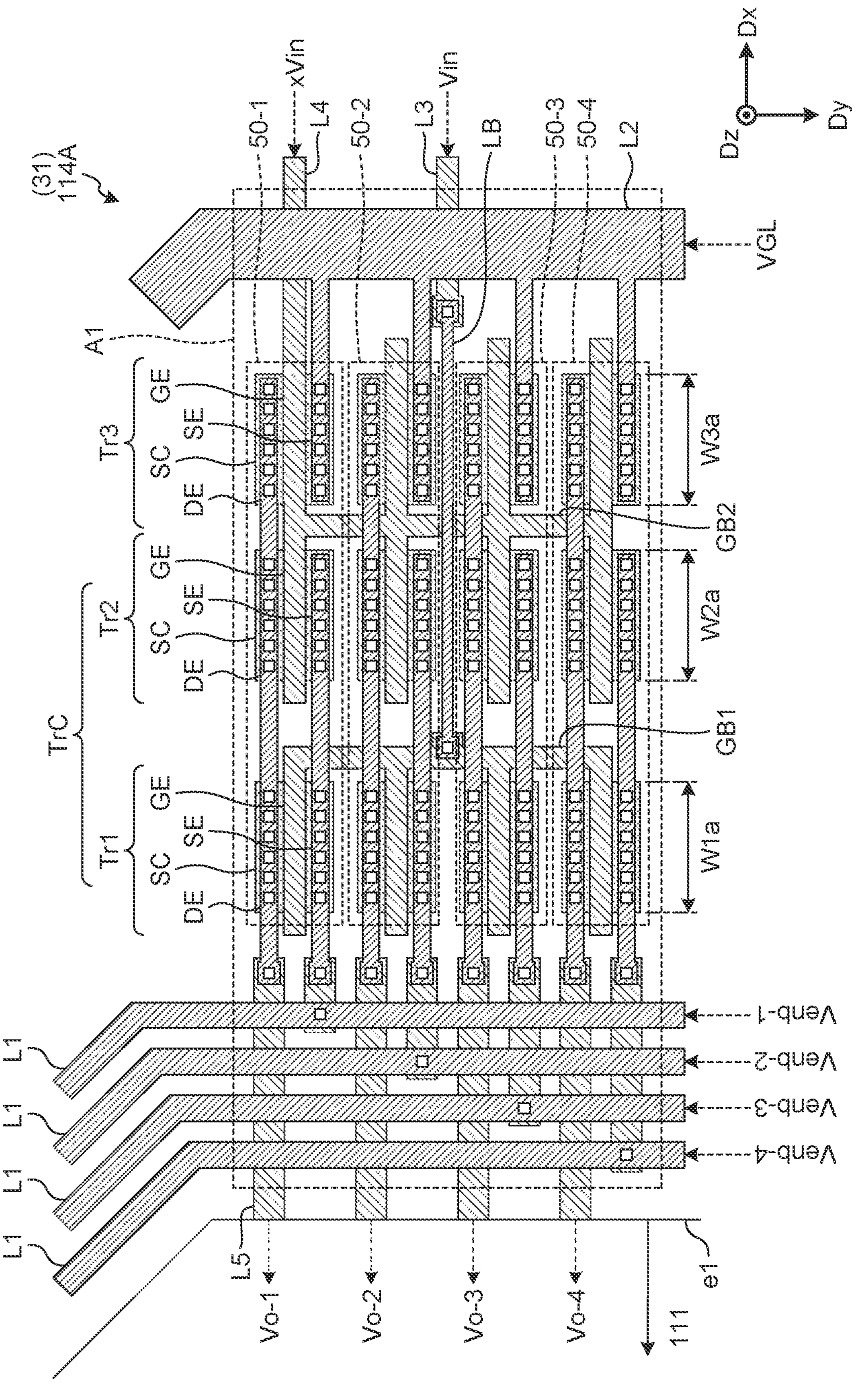
FIG. 10 is a plan view illustrating a region A1 in FIG. 5 in an enlarged manner.

FIG. 10 is a plan view illustrating a region A1 in FIG. 5 in an enlarged manner. As illustrated in FIG. 10, a plurality of output circuits 50-1, 50-2, 50-3, and 50-4 are arrayed alongside each other in the second direction Dy along the first side e1 of the display region 111. The output circuits 50-1, 50-2, 50-3, and 50-4 illustrated in FIG. 10 serve as some circuits of the first circuit portion 31 of the scanning line drive circuit 114A. In the following description, the output circuits 50-1, 50-2, 50-3, and 50-4 are simply referred to as output circuits 50 when not needing to be distinguished from one another.

The first switching element Tr1, the second switching element Tr2, and the third switching element Tr3 of each output circuit 50 are arrayed alongside each other in the direction (first direction Dx) orthogonal to the first side e1 of the display region 111. The wires L1 extend in the second direction Dy along the first side e1 between the first side e1 of the display region 111 and the first switching element Tr1. The wire L2 is provided on the substrate end part side of the third switching element Tr3 and extends in the second direction Dy.

The first switching element Tr1, the second switching element Tr2, and the third switching element Tr3 each include a semiconductor layer SC, a source electrode SE, a drain electrode DE, and a gate electrode GE. The source electrode SE, the drain electrode DE, and the gate electrode GE each extend in the direction (first direction Dx) orthogonal to the first side e1 of the display region 111. The gate electrode GE is provided over the semiconductor layer SC and disposed between the source electrode SE and the drain electrode DE in the direction (second direction Dy) along the first side e1. The semiconductor layer SC is electrically coupled to the drain electrode DE through a contact hole on one side of the gate electrode GE in the first direction Dx and electrically coupled to the source electrode SE through a contact hole on the other side of the gate electrode GE in the first direction Dx.

A channel region is formed at a part of the semiconductor layer SC, the part overlapping the gate electrode GE. The lengths of the channel regions of the semiconductor layers SC in a direction (in FIG. 10, the first direction Dx) along the direction in which each gate electrode GE extends are referred to as channel widths W1*a*, W2*a*, and W3*a*. In other words, the channel widths W1*a*, W2*a*, and W3*a* are the widths of the channel regions of the semiconductor layers SC in a direction orthogonal to the direction in which the source electrodes SE and the gate electrodes GE are connected. In the region A1, the directions (channel width direction) of the channel widths W1*a*, W2*a*, and W3*a* are along the direction (first direction Dx) orthogonal to the first side e1 of the display region 111.

In the following description, the channel widths W1*a*, W2*a*, and W3*a* are simply referred to as channel widths W when not needing to be distinguished from one another. The first switching element Tr1, the second switching element Tr2, and the third switching element Tr3 are simply referred to as switching elements Tr when not needing to be distinguished from one another.

In each output circuit 50, the channel widths W1*a*, W2*a*, and W3*a* of the first switching element Tr1, the second switching element Tr2, and the third switching element Tr3 are equal to one another in effect. The channel widths W1*a* of the first switching elements Tr1 of the output circuits 50-1, 50-2, 50-3, and 50-4 are equal to one another in effect. Similarly, the channel widths W2*a* of the second switching elements Tr2 are equal to one another in effect and the channel widths W3*a* of the third switching element Tr3 are equal to one another in effect. In other words, the channel widths W1*a*, W2*a*, and W3*a* of the switching elements electrically coupled to common wires L3 and L4 and turned on and off under control of the common input signals Vin and xVin are equal to one another in effect.

The drain electrodes DE of the first switching element Tr1, the second switching element Tr2, and the third switching element Tr3 are formed of a common wire and electrically coupled to an output wire L5. The output wire L5 extends toward the display region 111 across the wires L1 and is electrically coupled to the corresponding scanning line GL. The output wire L5 is a wire through which the output signal Vo from the output circuit 50 is output to the scanning line GL.

The source electrodes SE of the first switching element Tr1 and the second switching element Tr2 are formed of a common wire and electrically coupled to the corresponding wire L1 through which the first control signal Venb is supplied. The source electrode SE of the third switching element Tr3 are separated from the source electrodes SE of the first switching element Tr1 and the second switching element Tr2 and electrically coupled to the wire L2 through which the second control signal VGL is supplied.

The gate electrodes GE of the first switching elements Tr1 of the output circuits 50-1, 50-2, 50-3, and 50-4 are coupled in parallel to one another through a gate coupling wire GB1. The gate coupling wire GB1 extends in the second direction Dy across the source electrodes SE and the drain electrodes DE in a plan view. The four gate electrodes GE coupled through the gate coupling wire GB1 are electrically coupled to the wire L3 through a bridge wire LB. The wire L3 is a wire through which the input signal Vin is supplied to the gates of the first switching elements Tr1.

The gate electrodes GE of the second switching elements Tr2 and the gate electrodes GE of the third switching elements Tr3 are formed of a common wire. The gate electrodes GE of the second switching elements Tr2 and the gate electrodes GE of the third switching elements Tr3 in the output circuits 50-1, 50-2, 50-3, and 50-4 are coupled in parallel to one another through a gate coupling wire GB2. The gate coupling wire GB2 extends in the second direction Dy across the drain electrodes DE and the gate coupling wire GB1 in a plan view.

The gate electrodes GE of the second switching elements Tr2 and the gate electrodes GE of the third switching element Tr3 coupled to one another through the gate coupling wire GB2 are electrically coupled to the wire L4. The wire L4 is a wire through which the input signal xVin is supplied to the gates of the second switching elements Tr2 and the gates of the third switching elements Tr3.

Figure 11:
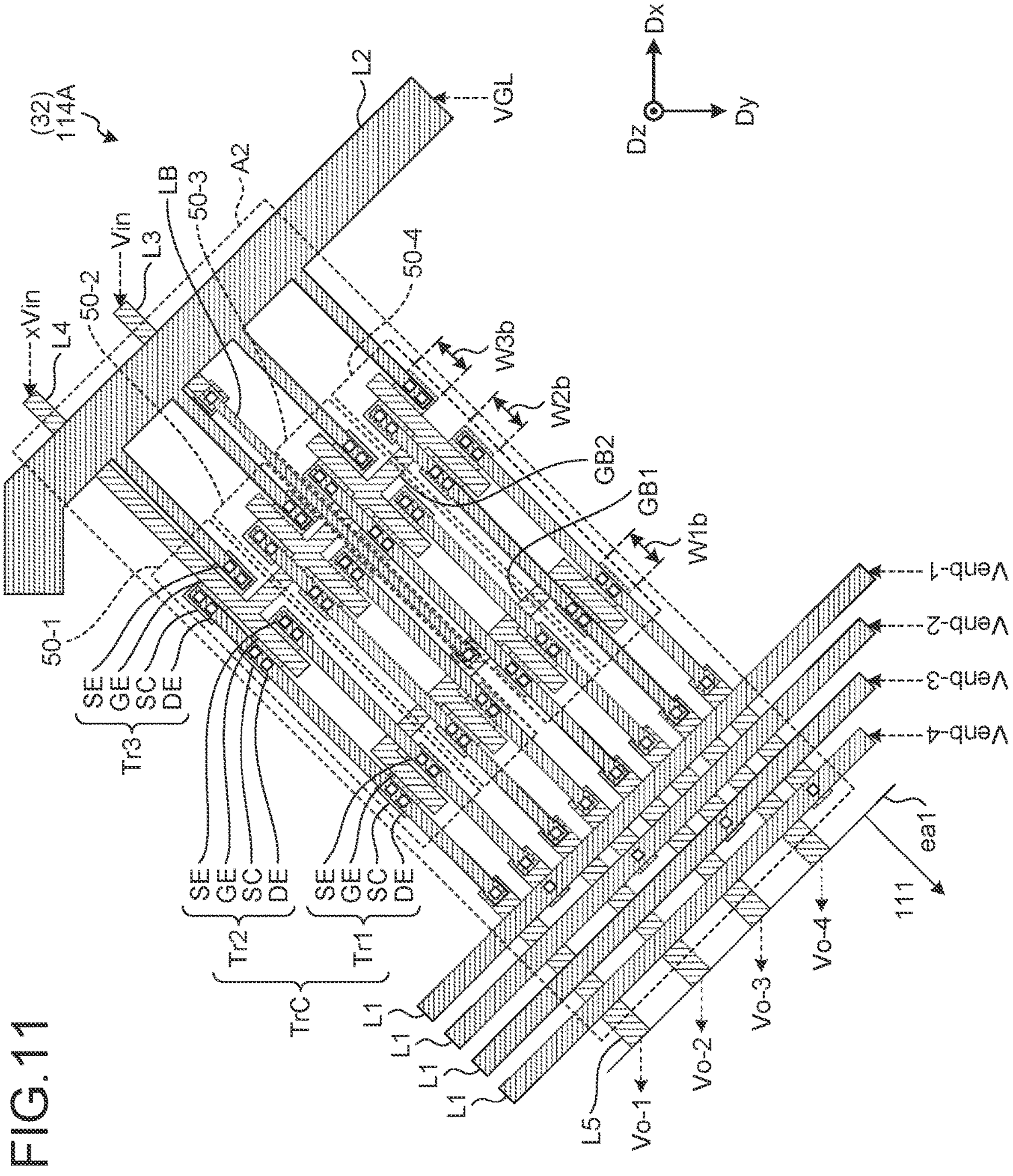
FIG. 11 is a plan view illustrating a region A2 in FIG. 5 in an enlarged manner.

FIG. 11 is a plan view illustrating a region A2 in FIG. 5 in an enlarged manner. The region A2 illustrated in FIG. 11 in an enlarged manner is located on a side of the first tilted side ea1, which is close to a coupling part to the third side e3 (refer to FIG. 5), in other words, on the upper end side of the display region 111, which is farthest away from the driver IC 115. The output circuits 50-1, 50-2, 50-3, and 50-4 illustrated in FIG. 11 serve as some circuits of the second circuit portion 32 of the scanning line drive circuit 114A.

As illustrated in FIG. 11, the output circuits 50-1, 50-2, 50-3, and 50-4 are arrayed alongside each other along the first tilted side ea1 of the display region 111. The first switching elements Tr1, the second switching elements Tr2, and the third switching elements Tr3 of the output circuits 50 in the region A2 are coupled in the same manner as in the region A1 described above with reference to FIG. 10, and duplicate description thereof is omitted.

In the region A2, the first switching element Tr1, the second switching element Tr2, and the third switching element Tr3 of each output circuit 50 are arrayed alongside each other in a direction orthogonal to the first tilted side ea1 (direction intersecting the first direction Dx and the second direction Dy). The wires L1 extend along the first tilted side ea1 between the first tilted side ea1 of the display region 111 and the first switching element Tr1. The wire L2 is provided on the substrate end part side of the third switching element Tr3 and extends in a direction parallel to a direction along the first tilted side ea1.

In the region A2, the source electrodes SE, the drain electrodes DE, and the gate electrodes GE of the first switching element Tr1, the second switching element Tr2, and the third switching element Tr3 extend in the direction orthogonal to the first tilted side ea1 of the display region 111 (direction intersecting the first direction Dx and the second direction Dy).

In the region A2, the directions of channel widths W1*b*, W2*b*, and W3*b* are provided along the direction orthogonal to the first tilted side ea1 of the display region 111 (direction intersecting the first direction Dx and the second direction Dy). The channel widths W1*b*, W2*b*, and W3*b* of the first switching element Tr1, the second switching element Tr2, and the third switching element Tr3 are equal to one another in effect. The channel widths W1*b*, W2*b*, and W3*b* of the switching elements are equivalent in effect among the output circuits 50-1, 50-2, 50-3, and 50-4.

The channel widths W1*b*, W2*b*, and W3*b* in the region A2 illustrated in FIG. 11 are shorter than the channel widths W1*a*, W2*a*, and W3*a* in the region A2 illustrated in FIG. 10. More specifically, the channel widths W1*b*, W2*b*, and W3*b* of the switching elements Tr (the first switching element Tr1, the second switching element Tr2, and the third switching element Tr3) arrayed along the first tilted side ea1 are shorter than the channel widths W1*a*, W2*a*, and W3*a* of the switching elements arrayed along the first side e1.

Figure 12:
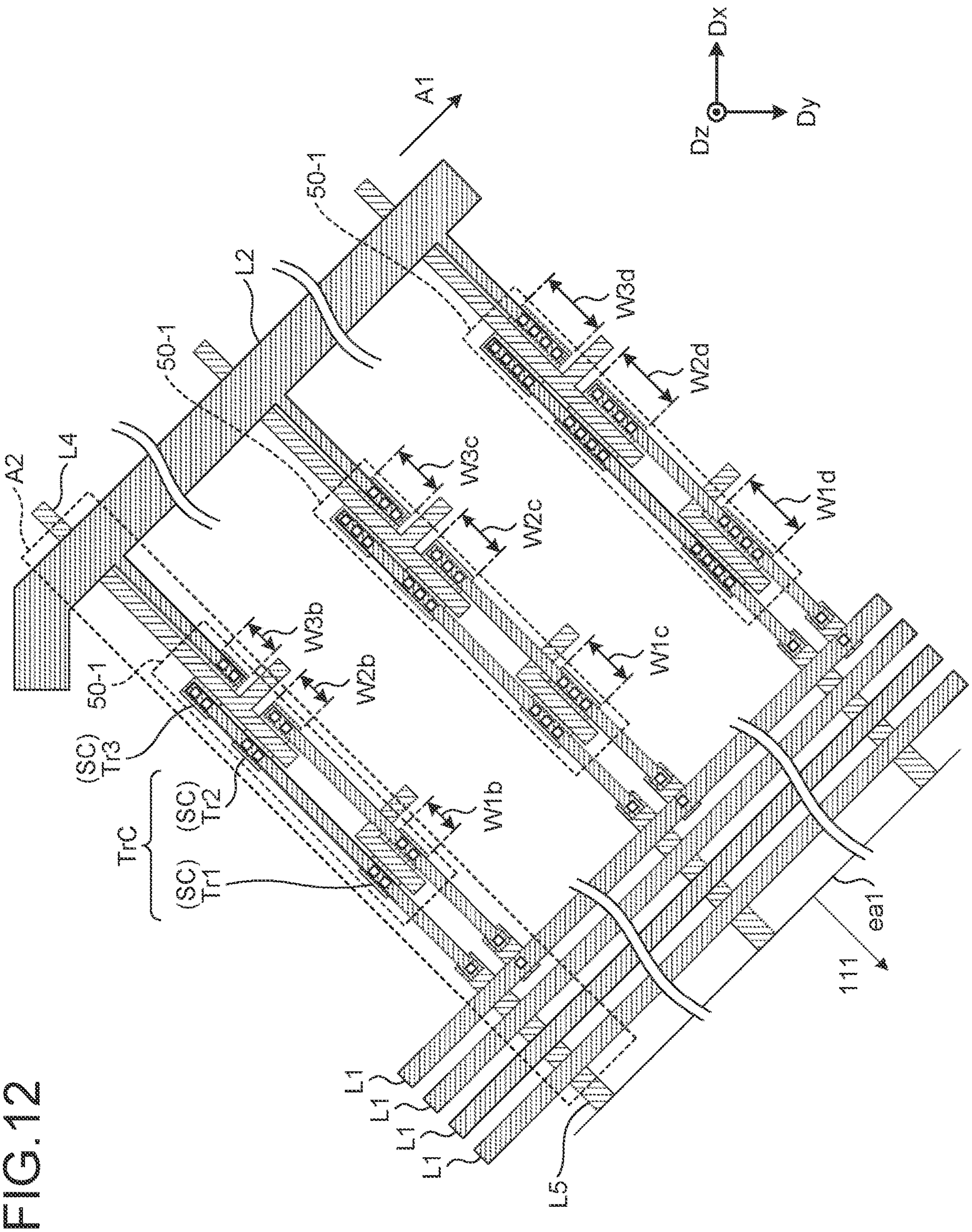
FIG. 12 is a plan view schematically illustrating a plurality of output circuits arrayed along a first tilted side of the display region.

FIG. 12 is a plan view schematically illustrating a plurality of output circuits arrayed along the first tilted side of the display region. FIG. 12 illustrates, in an enlarged manner, the side (region A2) of the first tilted side ea1, which is close to the coupling part to the third side e3 (refer to FIG. 5), a side (side close to the region A1) of the first tilted side ea1, which is close to a coupling part to the first side e1 (refer to FIG. 5), and a middle region between these regions. Although the output circuits 50-1 are illustrated in FIG. 12, the output circuits 50-2, 50-3, and 50-4 have the same configuration as the above-described configuration in FIG. 11.

As illustrated in FIG. 12, the channel widths W1*b*, W2*b*, and W3*b* of the switching elements in the region A2 are shorter than channel widths W1*c*, W2*c*, and W3*c* of switching elements in the middle region. The channel widths W1*c*, W2*c*, and W3*c* of switching elements in the middle region are shorter than channel widths W1*d*, W2*d*, and W3*d* of switching elements on the side close to the region A1.

As illustrated in FIGS. 11 and 12, the channel widths W1 of the switching elements Tr arrayed along the first tilted side ea1 decrease as separation from one end of the first side e1 in the direction along the first tilted side ea1 increases (in other words, as separation from the third side e3 decreases).

As described above with reference to FIG. 5, the lengths of the scanning lines GL provided in the region corresponding to the first tilted side ea1 in the first direction Dx are shorter than the lengths of the scanning lines GL provided in the regions corresponding to the first side e1 and the second side e2 in the first direction Dx. Moreover, the lengths of the scanning lines GL provided in the region corresponding to the first tilted side ea1 in the first direction Dx decrease as separation from the first side e1 in the direction along the first tilted side ea1 increases (in other words, as separation from the third side e3 decreases).

Accordingly, in the present embodiment, the channel width W of the switching element Tr is longer as the length of the scanning line GL electrically coupled to the switching elements (first switching element Tr1, second switching element Tr2, and third switching element Tr3) in the first direction Dx is longer. More specifically, the lengths of the scanning lines GL provided in the region corresponding to the first tilted side ea1 in the first direction Dx decrease as separation from the first side e1 in the direction along the first tilted side ea1 increases, and the channel widths W of the switching elements Tr arrayed along the first tilted side ea1 decrease as separation from the first side e1 increases.

The channel widths W of the switching elements Tr do not necessarily need to continuously decrease along the first tilted side ea1 but may decrease for each set of the switching elements Tr (for example, the switching elements Tr included in the four output circuits 50-1 to 50-4). The scanning lines GL do not necessarily need to continuously decrease along the first tilted side ea1 but may decrease for each scanning line block including the scanning lines GL.

In the present embodiment, illustration of the third circuit portion 33 provided along the second tilted side ea2 in the scanning line drive circuit 114A is omitted. The output circuits 50 of the third circuit portion 33 are disposed at tilt to which the output circuits 50 in FIGS. 11 and 12 are inverted in the up-down direction. For example, when the source electrode SE, the drain electrode DE, and the gate electrode GE of each switching element Tr in the output circuits 50 of the second circuit portion 32 illustrated in FIGS. 11 and 12 are tilted at an angle $+\theta°$ in the first direction Dx, the source electrode SE, the drain electrode DE, and the gate electrode GE of each switching element Tr in the output circuits 50 of the third circuit portion 33 are tilted at an angle $-\theta°$ in the first direction Dx.

The channel widths W of the switching elements Tr arrayed along the second tilted side ea2 are equal to the channel widths W of the switching elements Tr arrayed along the first tilted side ea1 in effect. Moreover, the channel widths W of the switching elements Tr arrayed along the second tilted side ea2 are shorter than the channel widths W of the switching elements Tr arrayed along the first side e1. Accordingly, the lengths of the scanning lines GL provided in the region corresponding to the second tilted side ea2 in the first direction Dx decrease as separation from the first side e1 in the direction along the second tilted side ea2 increases, and the channel widths W of the switching elements Tr arrayed along the second tilted side ea2 decrease as separation from the first side e1 increases.

In the display device 100 of the present embodiment with such a configuration, the resistance values of the switching elements Tr coupled to the scanning lines GL are reduced as the resistance values of the scanning lines GL are larger. Accordingly, the display device 100 of the present embodiment can reduce load variance among the scanning lines GL even when the display region 111 has a deformed shape.

Figure 13:
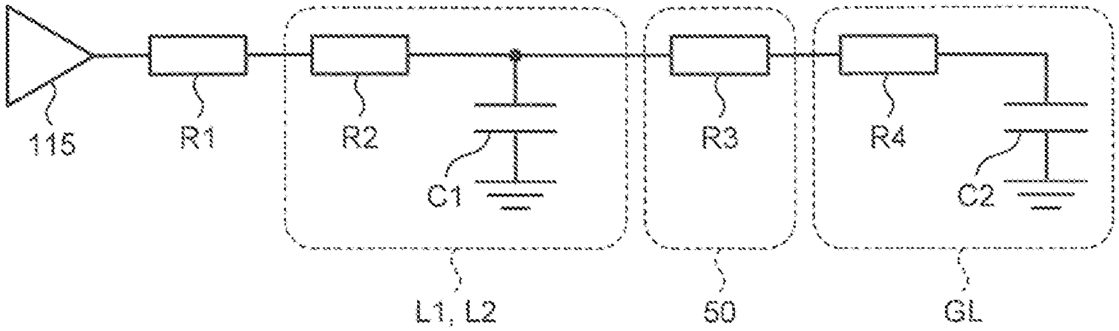
FIG. 13 is an explanatory diagram for description of a total load from a driver IC to a scanning line in the display panel according to the first embodiment.

The following describes a total load on each display panel 110 including loads on the scanning lines GL. FIG. 13 is an explanatory diagram for description of a total load from the driver IC to a scanning line in each display panel according to the first embodiment. As illustrated in FIG. 13, the total load on the display panel 110 from the driver IC 115 to the scanning line GL includes resistances R1, R2, R3, and R4 and capacitances C1 and C2.

The resistance R1 is a resistance component of output impedance of the driver IC 115. The resistance R2 and the capacitance C1 are a resistance component and a capacitance component of the wire L1 for supplying the first control signal Venb and the wire L2 for supplying the second control signal VGL (refer to FIGS. 10 to 12). The resistance R3 is a resistance component of the output circuit 50. The resistance R4 and the capacitance C2 are a resistance component and a capacitance component of the scanning line GL. FIG. 13 illustrates the load on the display panel 110 for one scanning line GL, and the resistance R2 and the capacitance C1 of the wires L1 and L2 are the resistance R2 and the capacitance C1 of the wires L1 and L2 coupled to one scanning line GL.

The scanning lines GL have lengths different among regions, and the values of the resistance R4 and the capacitance C2 in FIG. 13 are larger as the lengths of the scanning lines GL are longer. As described above, the channel widths W of switching elements Tr are longer as the lengths of the scanning lines GL in the first direction Dx are longer. In other words, the value of the resistance R3 of the output circuit 50 in FIG. 13 is smaller. Accordingly, load variance among the scanning lines GL can be reduced even when the display region 111 has a deformed shape and the lengths of the scanning lines GL are different from one another.

Figure 14:
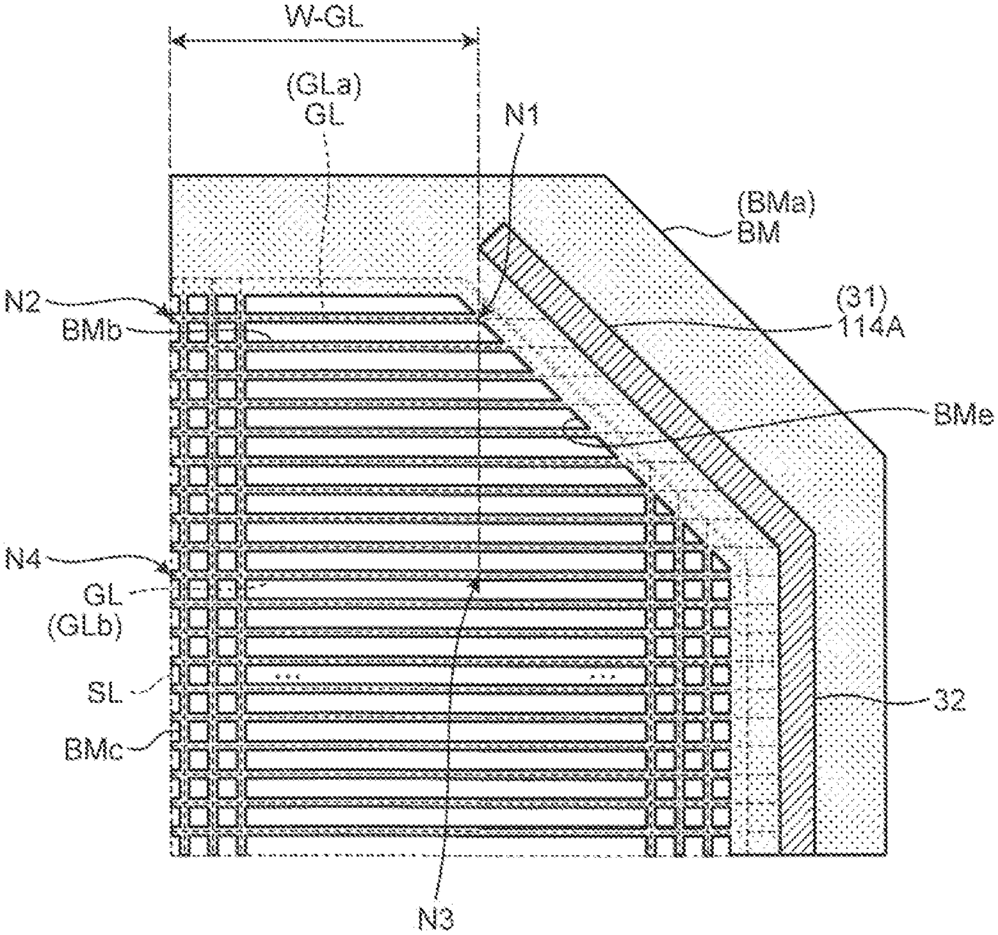
FIG. 14 is an explanatory diagram for description of the length of a scanning line.

The following describes the "length of the scanning line GL in the first direction Dx". FIG. 14 is an explanatory diagram for description of the length of a scanning line. FIG. 14 is a plan view schematically illustrating part of each display panel 110 in an enlarged manner, and the light-shielding layer BM is hatched. As illustrated in FIG. 14, the light-shielding layer BM includes a peripheral overlapping part BMa, a scanning line overlapping part BMb, and a signal line overlapping part BMc. The peripheral overlapping part BMa is provided in the peripheral region and overlaps a peripheral circuit such as the scanning line drive circuit 114A. The peripheral overlapping part BMa has an opening in a region overlapping the display region 111 and includes an inner edge part BMe provided along the outer periphery of the display region 111. The scanning line overlapping part BMb and the signal line overlapping part BMc are provided in a region surrounded by the inner edge part BMe (region overlapping the display region 111 in effect) and overlap the scanning line GL and the signal line SL, respectively.

In the present specification, when the inner edge part BMe of the peripheral overlapping part BMa has a straight shape along each side of the outer periphery of the display region 111, a length W-GL of the scanning line GL in the first direction Dx means the length of a part by which the scanning line GL extends on a side closer to a central part of the display region 111 than the inner edge part BMe. The inner edge part BMe of the peripheral overlapping part BMa is a virtual inner edge part BMe at which the scanning line overlapping part BMb and the signal line overlapping part BMc are not provided and that is continuous along each side of the outer periphery of the display region 111.

More specifically, when the scanning line drive circuit 114A is coupled to the right side of the scanning line GL in the first direction Dx and the scanning line drive circuit 114B (refer to FIG. 5) is coupled to the left side of the scanning line GL in the first direction Dx, the length W-GL of the scanning line GL in the first direction Dx is half of the length between a position at which the scanning line GL overlaps the inner edge part BMe on the right side in the first direction Dx and a position at which the scanning line GL overlaps the inner edge part BMe on the left side in the first direction Dx. In other words, the length W-GL is the length between a position at which the scanning line GL overlaps the inner edge part BMe and the middle point of the scanning line GL in the first direction Dx (left end of the scanning line GL in FIG. 14).

When only one of the scanning line drive circuits 114A and 114B is coupled to the scanning line GL, the length W-GL of the scanning line GL in the first direction Dx is the length between the position at which the scanning line GL overlaps the inner edge part BMe on the right side in the first direction Dx and the position at which the scanning line GL overlaps the inner edge part BMe on the left side in the first direction Dx.

Example

Figure 15:
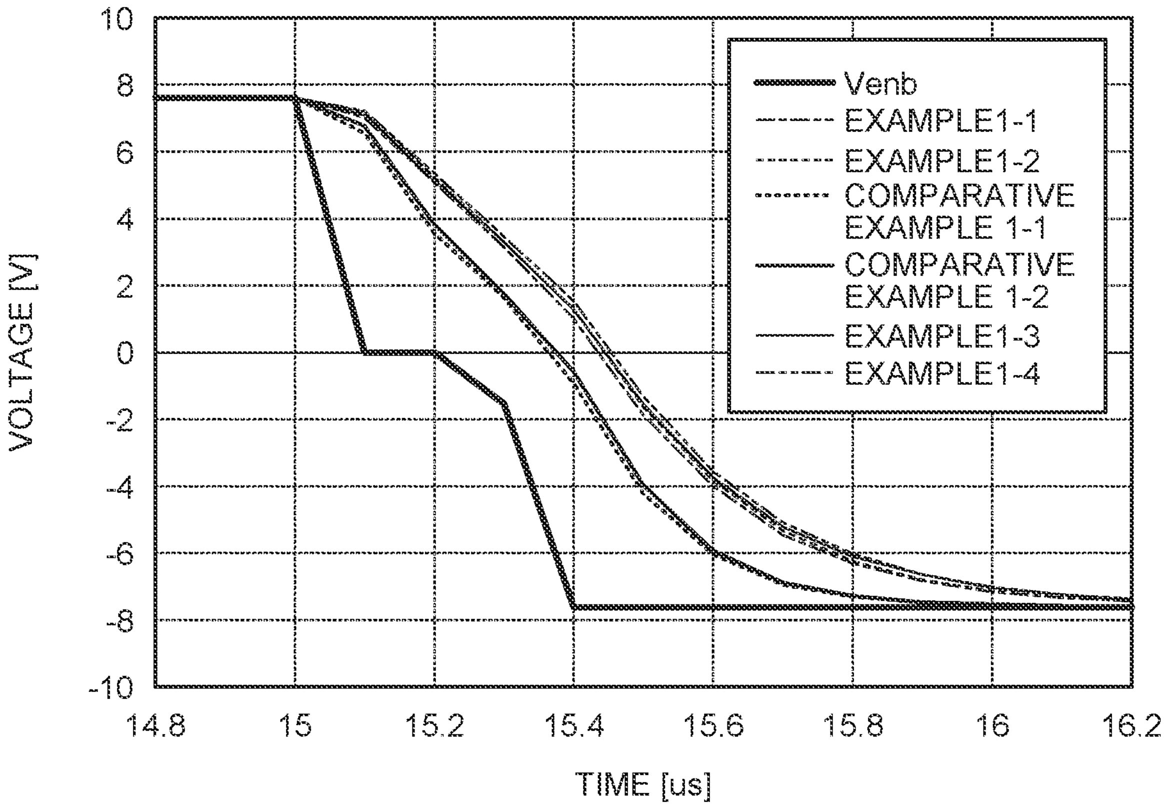
FIG. 15 is a graph schematically illustrating the relations of voltages of a first control signal and a plurality of scanning lines with time in display devices according to examples and comparative examples.

FIG. 15 is a graph schematically illustrating the relation of the voltages of the first control signal and a plurality of scanning lines with time in display devices according to examples and comparative examples. FIG. 15 is a simulation result indicating change in voltage of each scanning line GL when the first control signal Venb supplied from the driver IC 115 (drive signal supply circuit 54) changes from high (high level voltage) to low (low level voltage).

In Examples 1-1 to 1-4 in FIG. 15, the channel widths W1*a*, W2*a*, and W3*a* of the switching elements Tr of each output circuit 50 provided along the first side e1 of the display region 111 (refer to FIG. 10) are 60 μm, and the channel widths W1*b*, W2*b*, and W3*b* (refer to FIG. 11) of the switching elements Tr of each output circuit 50 provided along the first tilted side ea1 of the display region 111 are 25 μm. In Comparative Examples 1-1 and 1-2, the channel widths W1*a*, W2*a*, and W3*a* of the switching elements Tr of each output circuit 50 provided along the first side e1 of the display region 111 (refer to FIG. 10) and the channel widths W1*b*, W2*b*, and W3*b* of the switching elements Tr of each output circuit 50 provided along the first tilted side ea1 of the display region 111 (refer to FIG. 11) are 60 μm.

Example 1-1 illustrates voltage change of a scanning line GL (refer to a scanning line GLa in FIG. 14) at a position (refer to a position N1 in FIG. 14) overlapping the inner edge part BMe, the scanning line GL being located at a position farthest away from the driver IC 115 among the scanning lines GL provided in the region corresponding to the first tilted side ea1 of the display region 111. Example 1-2 illustrates voltage change of the scanning line GL at the middle point (refer to a position N2 in FIG. 14), the scanning line GL being located at the position farthest away from the driver IC 115 (refer to the scanning line GLa in FIG. 14). Example 1-3 illustrates voltage change of a scanning line GL (refer to a scanning line GLb in FIG. 14) at the same position in the first direction Dx (refer to a position N3 in FIG. 14) as the position N1 in Example 1-1, the scanning line GL being provided in the region corresponding to the first side e1 of the display region 111. Example 1-4 illustrates voltage change of the scanning line GL (refer to the scanning line GLb in FIG. 14) at the middle point (refer to position N4 in FIG. 14), the scanning line GL being provided in the region corresponding to the first side e1 of the display region 111.

Comparative Examples 1-1 and 1-2 illustrate voltage change of the scanning line GLa at the positions N1 and N2 when the channel widths W1*a*, W2*a*, W3*a*, W1*b*, W2*b*, and W3*b* (refer to FIG. 11) are 60 μm. In Comparative Examples 1-1 and 1-2, voltage change of the scanning line GL (refer to the scanning line GLb FIG. 14) provided in the region corresponding to the first side e1 is the same as in Examples 1-3 and 1-4, and illustration thereof is omitted.

As illustrated in FIG. 15, when the channel widths W of the switching elements Tr of each output circuit 50 is increased as the length of the corresponding scanning line GL in the first direction Dx is longer, the difference between the voltage values in Examples 1-1 and 1-2 and the voltage values in Examples 1-3 and 1-4 decreases and voltage change equivalent to that in Examples 1-3 and 1-4 occurs. In Comparative Examples 1-1 and 1-2, the difference of the voltage values is larger than in Examples 1-1, 1-2, 1-3, and 1-4.

The above-described result indicates that, in Examples 1-1 to 1-4, load variance among the scanning lines GL is reduced and the difference of the voltage values is reduced as compared to Comparative Examples 1-1 and 1-2.

Second Embodiment

Figure 16:
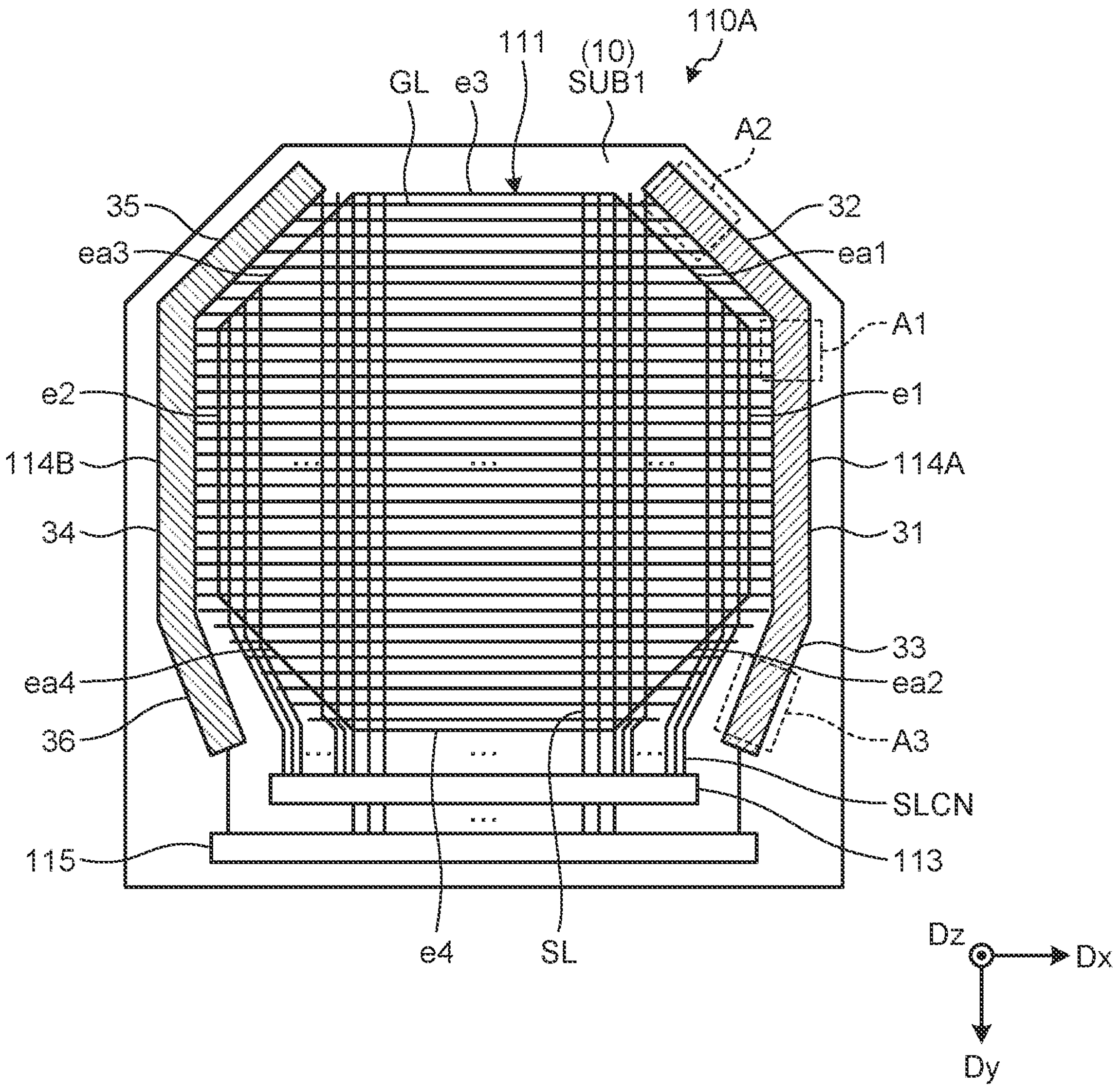
FIG. 16 is a schematic diagram illustrating an exemplary display panel according to a second embodiment.

FIG. 16 is a schematic diagram illustrating an exemplary display panel according to a second embodiment. In the following description, any same constituent component as in the above-described embodiment is denoted by the same reference sign and duplicate description thereof is omitted.

As illustrated in FIG. 16, in a display panel 110A according to the second embodiment, a plurality of signal line coupling wires SLCN coupling the signal lines SL to the signal line coupling circuit 113 are provided in a region between the third circuit portion 33 and the second tilted side ea2 of the display region 111. The third circuit portion 33 of the scanning line drive circuit 114A is disposed at a tilt angle different from that for the second circuit portion 32. Specifically, the distance between the third circuit portion 33 and the second tilted side ea2 of the display region 111 is longer than the distance between the second circuit portion 32 and the first tilted side ea1 of the display region 111. The third circuit portion 33 is disposed so that the distance to the second tilted side ea2 of the display region 111 is longer at a position closer to the signal line coupling circuit 113.

Although the following description of the second embodiment is made on the third circuit portion 33 of the scanning line drive circuit 114A, the description of the third circuit portion 33 of the scanning line drive circuit 114A is also applicable to the sixth circuit portion 36 of the scanning line drive circuit 114B.

Figure 17:
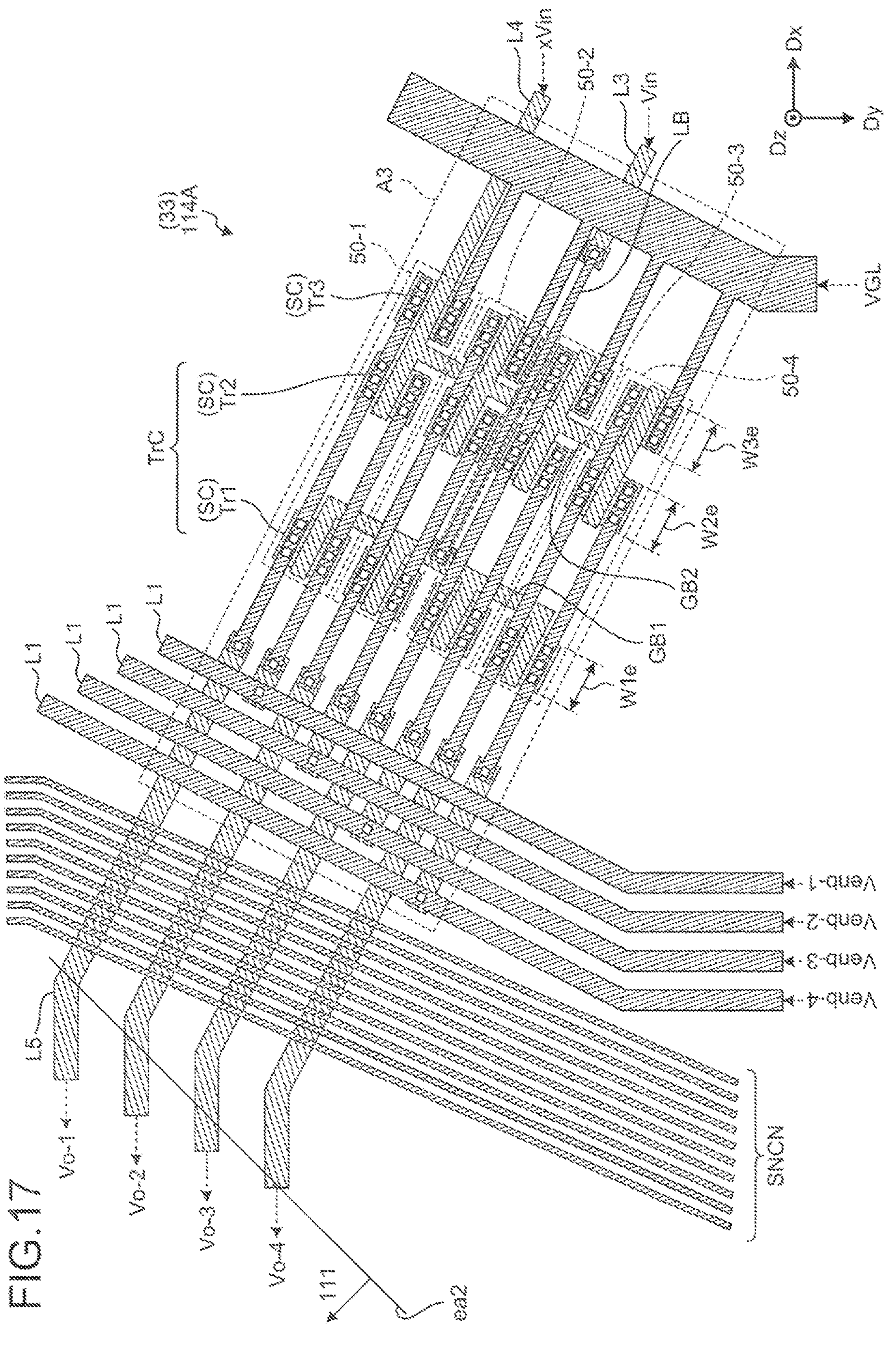
FIG. 17 is a plan view schematically illustrating a plurality of output circuits arrayed along a second tilted side of the display region in the display panel according to the second embodiment.

FIG. 17 is a plan view schematically illustrating a plurality of output circuits arrayed along the second tilted side of the display region in the display panel according to the second embodiment. FIG. 17 is a plan view illustrating a region A3 in FIG. 16 in an enlarged manner. The first switching elements Tr1, the second switching elements Tr2, and the third switching elements Tr3 of a plurality of output circuits 50 in the region A3 are coupled in the same manner as in the regions A1 and A2 described above with reference to FIGS. 10 and 11, and duplicate description thereof is omitted.

As illustrated in FIG. 17, the signal line coupling wires SLCN are provided in a region from the second tilted side ea2 to a plurality of switching elements Tr arrayed along the second tilted side ea2 and four wires L1 for supplying the first control signal Venb. Each output wire L5 is coupled to the drain electrode DE of the corresponding switching element Tr, extends toward the display region 111 across the wires L1 and the signal line coupling wires SLCN, and is electrically coupled to the corresponding scanning line GL. Accordingly, the distance between the second tilted side ea2 and the switching elements Tr arrayed along the second tilted side ea2 is longer than the distance between the first tilted side ea1 and the switching elements Tr arrayed along the first tilted side ea1. A load on the output circuits 50 in the region A3 is larger than that on the output circuits 50 (refer to FIG. 11) in the region A2 by an amount corresponding to the capacitance of parts at which the output wires L5 intersects the signal line coupling wires SLCN. In other words, the capacitance C2 (refer to FIG. 13) of each scanning line GL is larger in effect.

In the second embodiment, channel widths W1*e*, W2*e*, and W3*e* of the switching elements Tr arrayed along the second tilted side ea2 are longer than the channel widths W1*b*, W2*b*, and W3*b* of the switching elements Tr arrayed along the first tilted side ea1 (refer to FIG. 11). Moreover, the channel widths W1*e*, W2*e*, and W3*e* of the switching elements Tr arrayed along the second tilted side ea2 are shorter than the channel widths W1*a*, W2*a*, and W3*a* of the switching elements Tr arrayed along the first side e1 (refer to FIG. 10).

For example, when the channel widths W1*b*, W2*b*, and W3*b* of the switching elements Tr arrayed along the first tilted side ea1 are 25 μm, the channel widths W1*e*, W2*e*, and W3*e* of the switching elements Tr arrayed along the second tilted side ea2 are 30 μm approximately. However, the lengths of the channel widths W1*e*, W2*e*, and W3*e* are merely exemplary and may be changed as appropriate. Although only four output circuits 50 among the output circuits 50 along the second tilted side ea2 are illustrated in FIG. 17, the channel widths W of the switching elements Tr arrayed along the second tilted side ea2 decrease as separation from the first side e1 in the direction along the second tilted side ea2 increases (in other words, as separation from the fourth side e4 decreases), as in the example illustrated in FIG. 12.

In the second embodiment with such a configuration, load variance among the scanning lines GL can be reduced across the entire side including the first tilted side ea1, the first side e1, and the second tilted side ea2 of the display region 111 even when resistance value variance occurs between the scanning lines GL at the first tilted side ea1 and the scanning lines GL at the second tilted side ea2.

In FIG. 17, the source electrode SE, the drain electrode DE, and the gate electrode GE of each switching element Tr extend in a direction not orthogonal to the second tilted side ea2. However, the present disclosure is not limited thereto and the source electrode SE, the drain electrode DE, and the gate electrode GE of each switching element Tr may extend in a direction orthogonal to the second tilted side ea2.

Modification

Figure 18:
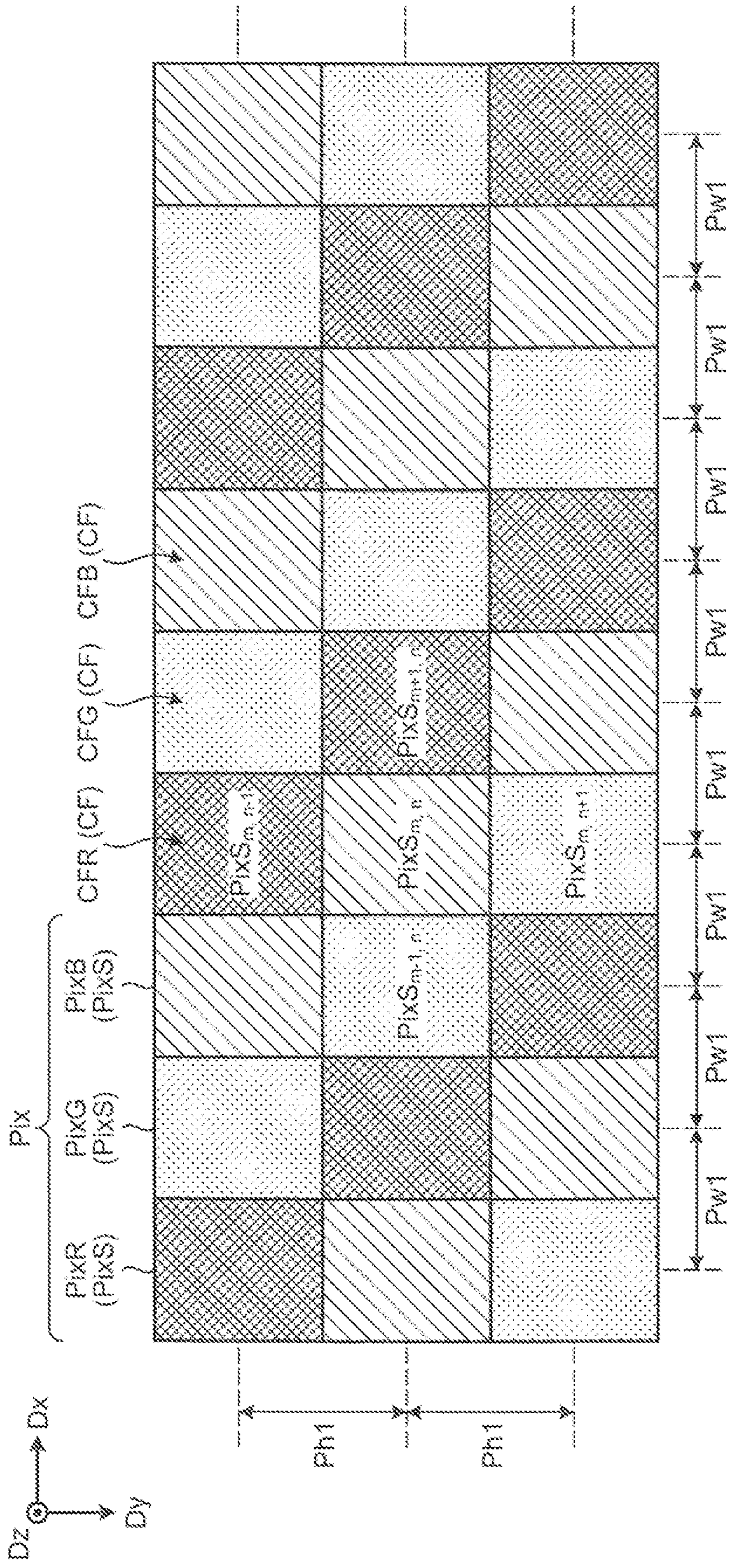
FIG. 18 is a diagram illustrating a modification of the pixel arrangement.

FIG. 18 is a diagram illustrating a modification of the pixel arrangement. As illustrated in FIG. 18, in the pixel arrangement according to the modification, the pixels PixR, PixG, and PixB are repeatedly arranged in the stated order in the first direction Dx and the positions of the pixels PixR, PixG, and PixB are shifted between rows. The pixels PixR, PixG, and PixB are repeatedly arranged in the stated order in the second direction Dy as well.

A distance Ph1 (disposition pitch) between pixels PixS (pixels PixR, PixG, and PixB) illustrated in FIG. 18 in the second direction Dy is shorter than the distance Ph1 (disposition pitch) in the pixel configuration according to the first embodiment illustrated in FIG. 7. A distance Pw1 between pixels PixS (pixels PixR, PixG, and PixB) illustrated in FIG. 18 in the first direction Dx is longer than the distance Pw1 in the pixel configuration according to the first embodiment illustrated in FIG. 7.

In the pixel arrangement according to the modification, the disposition pitch between scanning lines GL decreases in accordance with the distance Ph1 (disposition pitch)

between the pixels PixS. Accordingly, constraint on disposition of a peripheral circuit becomes large and it becomes difficult to dispose a circuit or element for adjusting loads on the scanning lines GL. In this case as well, according to the first and second embodiments described above, no circuit nor element for adjusting the loads needs to be added and it is possible to reduce variance among the loads on the scanning lines GL by adjusting the channel widths W of the switching elements Tr. Moreover, such pixel arrangement can increase the resolution of the display panel 110 and is excellently employed in the display panel 110 for a VR system. The pixel arrangement according to the modification is also applicable to any of the first and second embodiments.

Third Embodiment

Figure 19:
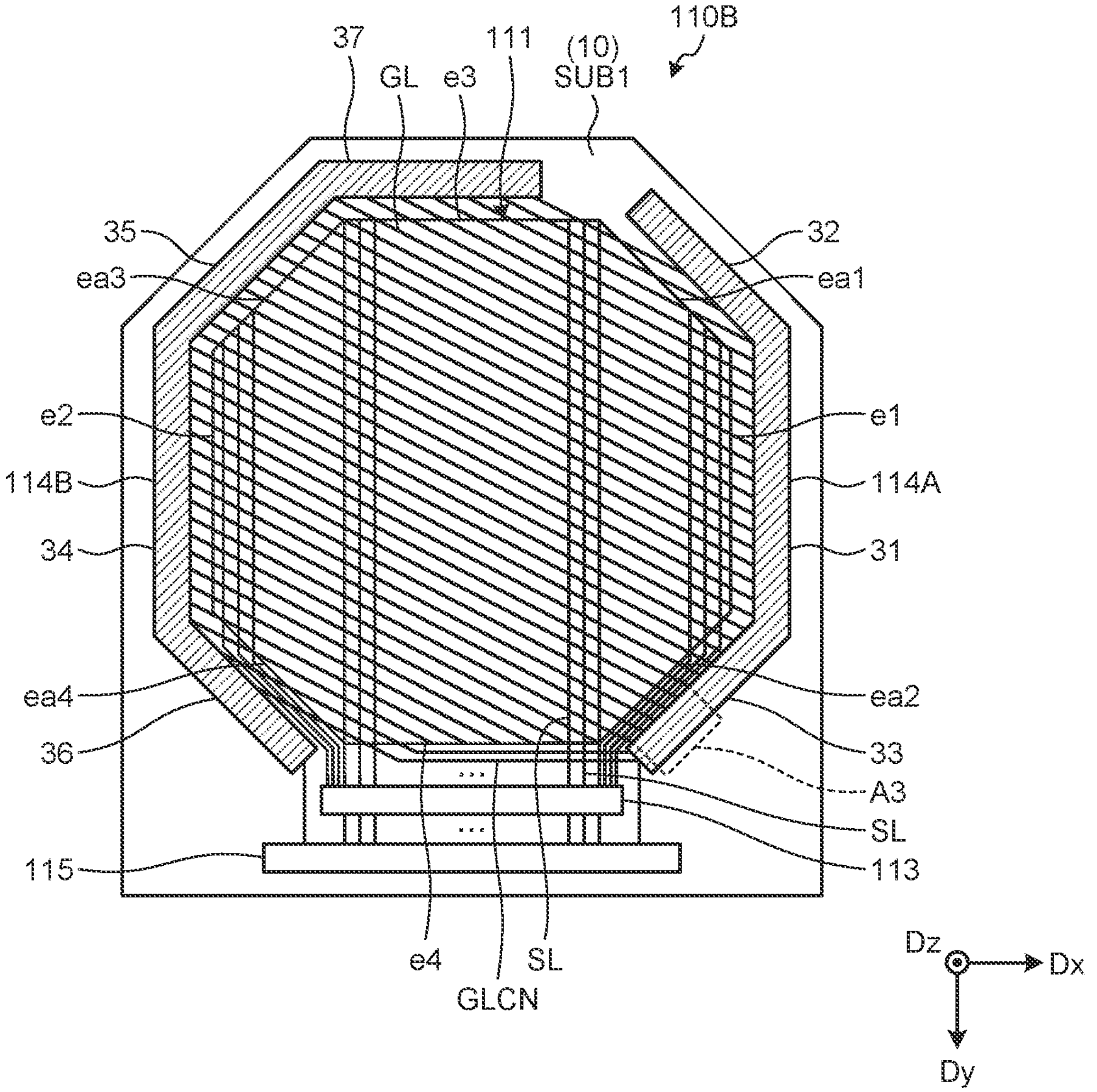
FIG. 19 is a schematic diagram illustrating an exemplary display panel according to a third embodiment.

FIG. 19 is a schematic diagram illustrating an exemplary display panel according to a third embodiment. As illustrated in FIG. 19, in a display panel 110B according to the third embodiment, the direction in which the scanning lines GL extend is not parallel nor orthogonal to the direction in which the signal lines SL extend. Specifically, the signal lines SL extend in the second direction Dy. The scanning lines GL extend in a direction tilted in the first direction Dx and the second direction Dy.

The scanning line drive circuit 114B includes a seventh circuit portion 37 extending along the third side e3 so that scanning lines GL are provided at a corner part of the display region 111 where the third side e3 is coupled to the first tilted side ea1. The scanning lines GL at the fourth side e4 of the display region 111 are electrically coupled to the scanning line drive circuit 114A through scanning line coupling wires GLCN.

In the example illustrated in FIG. 19, a scanning line GL connecting a corner part of the display region 111 where the first side e1 is coupled to the second tilted side ea2 and a corner part of the display region 111 where the second side e2 is coupled to the third tilted side ea3 is longest among the scanning lines GL. The lengths of the scanning lines GL gradually decrease as separation from the longest scanning line GL in a direction orthogonal to the scanning lines GL increases.

In the present embodiment, the lengths of the scanning lines GL provided in the region corresponding to the first side e1 of the display region 111 are not constant but decrease in the direction from the second tilted side ea2 side to the first tilted side ea1 side. The channel widths W of the switching elements Tr arrayed along the first side e1 are shorter as the scanning lines GL are shorter. The scanning lines GL provided in the region corresponding to the first side e1 of the display region 111 are shorter in the direction from the third tilted side ea3 side to the fourth tilted side ea4 side. The channel widths W of the switching elements Tr arrayed along the second side e2 are shorter as the scanning lines GL are shorter.

Figure 20:
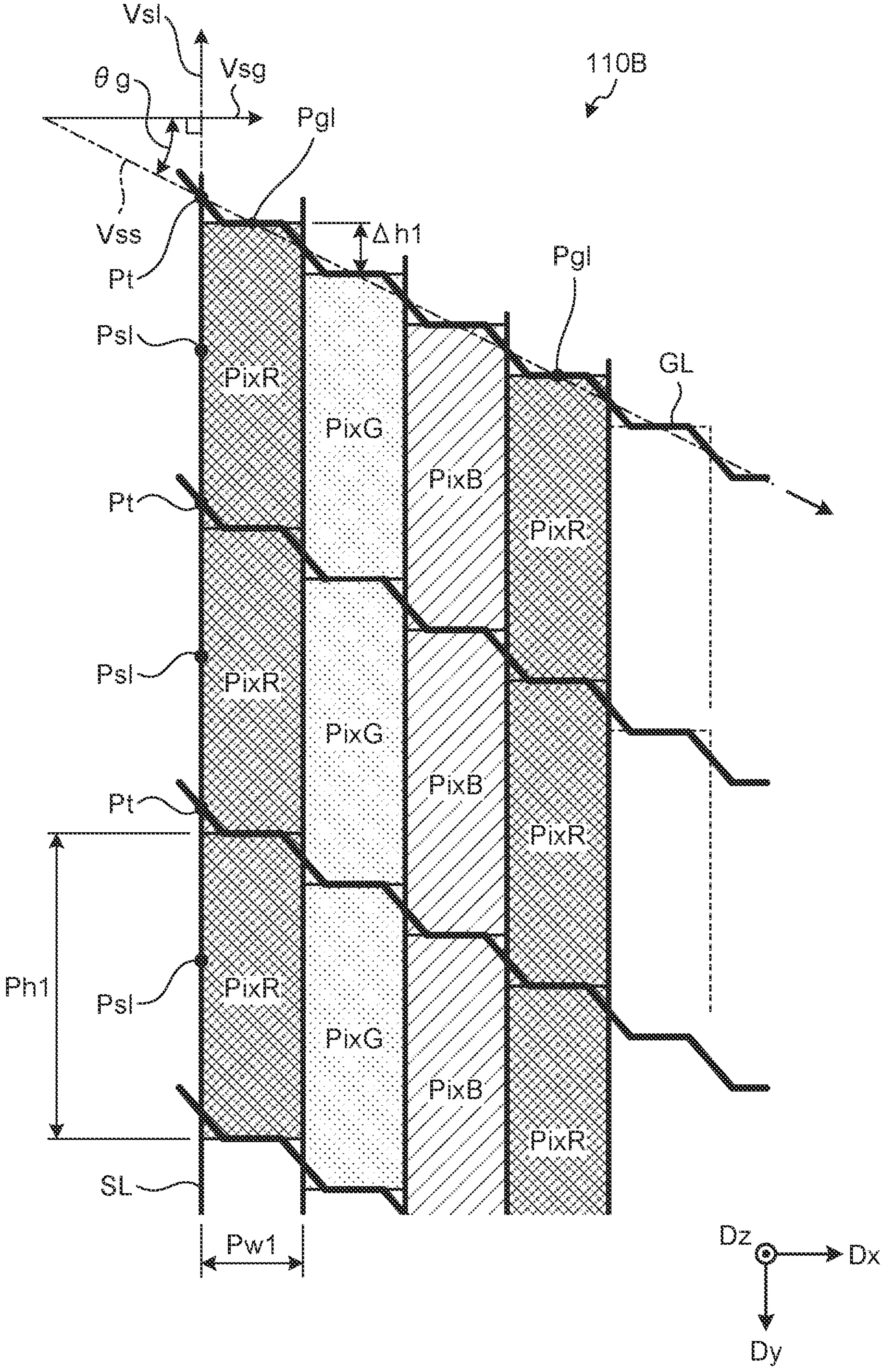
FIG. 20 is a schematic diagram illustrating the relation among a pixel arrangement, signal lines, and scanning lines in the display panel according to the third embodiment.

FIG. 20 is a schematic diagram illustrating the relation among a pixel arrangement, signal lines, and scanning lines in the display panel according to the third embodiment. As illustrated in FIG. 20, the pixels PixR, PixG, and PixB are arranged and shifted from each other in the second direction Dy. The relation of Pw1:Ph1=1:3 holds when the lengths of the pixels PixR, PixG, and PixB in the first direction Dx are the distance Pw1 and the lengths of the pixels PixR, PixG, and PixB in the second direction Dy are the distance Ph1.

In FIG. 20, a direction Vs1 is a direction in which the signal lines SL extend. A direction Vsg orthogonal to the direction Vs1 is parallel to the first direction Dx. A direction Vss is a direction in which the scanning lines GL extend. The scanning lines GL are tilted in the first direction Dx by an angle θg between the directions Vss and Vsg.

As illustrated in FIG. 20, the direction Vss is a direction in which a virtual line connecting first reference positions Pg1 at the pixels PixR coupled to one scanning line GL extends. For example, each first reference position Pg1 is the middle point on the scanning line GL between adjacent signal lines SL intersecting the scanning line GL in a plan view. The first reference position Pg1 is not limited thereto but may be, for example, the area barycenter of the pixel PixR. The first reference position Pg1 is defined with reference to the pixel PixR above but may be defined with reference to a pixel PixG or PixB in place of the pixel PixR.

As illustrated in FIG. 20, the direction Vs1 is a direction in which a virtual line connecting second reference positions Ps1 at the pixels PixR coupled to one signal line SL extends. For example, each second reference position Ps1 is the middle point on the signal line SL between intersection positions Pt of scanning lines GL with the signal line SL in a plan view. The second reference position Ps1 is not limited thereto but may be, for example, the area barycenter of the pixel PixR. The second reference position Ps1 is defined with reference to the pixel PixR above but may be defined with reference to a pixel PixG or PixB in place of the pixel PixR.

As illustrated in FIG. 20, the pixel PixR is shifted from an adjacent pixel PixG by a distance Δh1 in the direction Vs1. Two pixels PixR coupled to one scanning line GL are shifted from each other by triple of the distance Δh1. When half of the distance Ph1 illustrated in FIG. 6 is equal to triple of the distance Δh1 illustrated in FIG. 20, adjacent pixels of the same color in the first direction Dx, for example, the pixels PixR are shifted from each other by half in the direction Vs1. Thus, pixels of the same color are located at two kinds of positions in an even-numbered column and an odd-numbered column. As a result, black and white lines in the horizontal direction can be displayed more finely, and accordingly, the effective resolution of the display device 100 is improved. When the scanning lines GL illustrated in FIG. 20 extend straight in the direction Vss, the pixels PixR, PixG, and PixB form parallelograms as illustrated in FIG. 19.

The pixel arrangement and pixel disposition pitches illustrated in FIG. 20 are merely exemplary and may be changed as appropriate.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure. At least one of omission, replacement, and change of various constituent components may be performed without departing from the scope of the embodiments and the modification described above.

What is claimed is:

1. A display device comprising:

a substrate;

a plurality of pixels provided in a display region of the substrate;

a plurality of signal lines arrayed alongside each other in a first direction and extending in a second direction intersecting the first direction;

a plurality of scanning lines extending in a direction intersecting the signal lines; and a scanning line drive circuit disposed in a peripheral region between an end part of the substrate and the display region and including a plurality of switching elements coupled to the scanning lines, wherein the scanning lines include at least two or more scanning lines having different lengths, the switching elements have longer channel widths as the scanning lines electrically coupled to the switching elements have longer lengths, an outer periphery of the display region includes a first side extending in the second direction, and a first tilted side coupled to one end side of the first side and tilted in the second direction, the lengths of the scanning lines provided in a region corresponding to the first tilted side are shorter than the lengths of the scanning lines provided in a region corresponding to the first side, and the channel widths of the switching elements arrayed along the first tilted side are shorter than the channel widths of the switching elements arrayed along the first side.

2. The display device according to claim 1, wherein the lengths of the scanning lines provided in the region corresponding to the first tilted side decrease as separation from the first side in a direction along the first tilted side increases, and the channel widths of the switching elements arrayed along the first tilted side decrease as separation from the first side increases.

3. The display device according to claim 1, wherein the outer periphery of the display region includes a second tilted side coupled to the other end side of the first side and tilted in the second direction, and the channel widths of the switching elements arrayed along the second tilted side are shorter than the channel widths of the switching elements arrayed along the first side.

4. The display device according to claim 3, wherein the channel widths of the switching elements arrayed along the second tilted side are equal to the channel widths of the switching elements arrayed along the first tilted side.

5. The display device according to claim 3, wherein the distance between the second tilted side and the switching elements arrayed along the second tilted side is longer than the distance between the first tilted side and the switching elements arrayed along the first tilted side, and the channel widths of the switching elements arrayed along the second tilted side are longer than the channel widths of the switching elements arrayed along the first tilted side.

6. The display device according to claim 5, further comprising:

a signal line coupling circuit disposed in the peripheral region and electrically coupled to the signal lines;

a driver IC disposed in the peripheral region and configured to control the scanning line drive circuit and the signal line coupling circuit; and a plurality of coupling wires coupling the signal lines provided in the display region to the signal line coupling circuit, wherein the coupling wires extend in a direction along the second tilted side between the second tilted side and the switching elements arrayed along the second tilted side.

7. The display device according to claim 1, wherein the switching elements arrayed along the first side have a channel width direction orthogonal to the first side, and the switching elements arrayed along the first tilted side have a channel width direction orthogonal to the first tilted side.

8. The display device according to claim 1, wherein the switching elements include a first switching element, a second switching element, and a third switching element that are electrically coupled to one of the scanning lines, the first switching element, the second switching element, and the third switching element each include a semiconductor layer, a source electrode, a drain electrode, and a gate electrode, the source electrode, the drain electrode, and the gate electrode extend in a direction intersecting a side of the outer periphery of the display region, and the gate electrode is provided over the semiconductor layer and disposed between the source electrode and the drain electrode in a direction along the side of the outer periphery of the display region.

* * * * *